United States Patent
Chen

(10) Patent No.: US 9,995,652 B1
(45) Date of Patent: Jun. 12, 2018

(54) INDUCTION DIAGNOSTICS FOR SKIP FIRE ENGINES

(71) Applicant: Tula Technology, Inc., San Jose, CA (US)

(72) Inventor: Shikui Kevin Chen, San Jose, CA (US)

(73) Assignee: Tula Technology, Inc., San Jose, CA (US)

(*) Notice: Subject to any disclaimer, the term of this patent is extended or adjusted under 35 U.S.C. 154(b) by 0 days. days.

(21) Appl. No.: 15/872,675

(22) Filed: Jan. 16, 2018

Related U.S. Application Data

(60) Continuation-in-part of application No. 15/641,097, filed on Jul. 3, 2017, now Pat. No. 9,891,137, which is a division of application No. 14/919,385, filed on Oct. 21, 2015, now Pat. No. 9,835,522.

(60) Provisional application No. 62/067,873, filed on Oct. 23, 2014.

(51) Int. Cl.
| | |
|---|---|
| *G01M 15/05* | (2006.01) |
| *G01M 15/09* | (2006.01) |
| *F02M 35/10* | (2006.01) |

(52) U.S. Cl.
CPC ........ *G01M 15/05* (2013.01); *F02M 35/1038* (2013.01); *G01M 15/09* (2013.01)

(58) Field of Classification Search
CPC ... F02M 35/1038; G01M 15/05; G01M 15/09
See application file for complete search history.

(56) References Cited

U.S. PATENT DOCUMENTS

| | | | |
|---|---|---|---|
| 4,434,767 A | 3/1984 | Kohama et al. | |
| 4,489,695 A | 12/1984 | Kohama et al. | |
| 4,509,488 A | 4/1985 | Forster et al. | |
| 5,377,631 A | 1/1995 | Schechter | |
| 5,490,486 A | 2/1996 | Diggs | |
| 5,915,272 A * | 6/1999 | Foley .................... | G01M 15/09 701/110 |
| 6,082,330 A | 7/2000 | Alberter et al. | |
| 6,158,411 A | 12/2000 | Morikawa | |
| 6,408,625 B1 | 6/2002 | Woon et al. | |
| 6,619,258 B2 | 9/2003 | McKay et al. | |
| 7,063,062 B2 | 6/2006 | Lewis et al. | |
| 7,066,136 B2 | 6/2006 | Ogiso | |

(Continued)

OTHER PUBLICATIONS

International Search Report dated Feb. 23, 2016 from International Application No. PCT/US15/56732.

(Continued)

*Primary Examiner* — Francis Gray
(74) *Attorney, Agent, or Firm* — Beyer Law Group LLP

(57) ABSTRACT

A variety of methods, diagnostic modules and other arrangements for detecting air induction faults during operation of an internal combustion engine are described. In some embodiments, the intake manifold pressure is monitored with the intake pressure being read for each induction opportunity. Induction faults may be detected based at least in part on a comparison of the manifold pressure readings for sequential induction opportunities. In some embodiments, an induction fault is identified when the difference between the manifold pressure associated with an induction opportunity and the immediately preceding induction opportunity exceeds an induction fault threshold.

23 Claims, 12 Drawing Sheets

(56) References Cited

U.S. PATENT DOCUMENTS

| | | |
|---|---|---|
| 7,086,386 B2 | 8/2006 | Doering |
| 7,142,973 B2 | 11/2006 | Ando |
| 7,314,034 B1* | 1/2008 | Waters .................. F02D 13/06 123/198 F |
| 7,357,019 B2 | 4/2008 | McDonald et al. |
| 7,503,312 B2 | 3/2009 | Surnilla et al. |
| 7,577,511 B1 | 8/2009 | Tripathi et al. |
| 7,762,237 B2 | 7/2010 | Gibson et al. |
| 7,900,509 B2 | 3/2011 | Feldkamp et al. |
| 7,908,913 B2 | 3/2011 | Cinpinski et al. |
| 7,921,709 B2 | 4/2011 | Doering et al. |
| 7,930,087 B2 | 4/2011 | Gibson et al. |
| 8,099,224 B2 | 1/2012 | Tripathi et al. |
| 8,103,433 B2 | 1/2012 | Hartmann et al. |
| 8,181,508 B2 | 3/2012 | Cinpinski et al. |
| 8,286,471 B2 | 10/2012 | Doering et al. |
| 8,301,362 B2 | 10/2012 | Buslepp et al. |
| 8,631,688 B1 | 1/2014 | Rayl et al. |
| 8,666,641 B2 | 3/2014 | Rollinger et al. |
| 8,667,835 B2 | 3/2014 | Doering et al. |
| 8,826,891 B2 | 9/2014 | Nishikiori et al. |
| 9,086,020 B2 | 7/2015 | Tripathi et al. |
| 9,175,613 B2 | 11/2015 | Parsels et al. |
| 9,212,610 B2 | 12/2015 | Chen et al. |
| 9,399,963 B2 | 7/2016 | Loucks et al. |
| 9,562,470 B2 | 2/2017 | Younkins et al. |
| 9,835,522 B2 | 12/2017 | Chen et al. |
| 2005/0199220 A1 | 9/2005 | Osigo |
| 2005/0217620 A1 | 10/2005 | Shindou |
| 2009/0066337 A1 | 3/2009 | Gibson et al. |
| 2010/0031738 A1 | 2/2010 | Feldkamp et al. |
| 2010/0050993 A1 | 3/2010 | Zhao et al. |
| 2010/0126260 A1* | 5/2010 | Bowling ................ G01M 15/09 73/114.37 |
| 2010/0154738 A1 | 6/2010 | Tsukamoto et al. |
| 2010/0175462 A1* | 7/2010 | Doering ................ F01L 13/00 73/114.31 |
| 2011/0167900 A1 | 7/2011 | Zanotti et al. |
| 2013/0325290 A1 | 12/2013 | Pierik |
| 2014/0261309 A1 | 9/2014 | Chen et al. |
| 2014/0261317 A1* | 9/2014 | Loucks ............... F02D 41/0087 123/350 |
| 2015/0192080 A1 | 7/2015 | Younkins et al. |
| 2015/0377095 A1 | 12/2015 | Walther et al. |
| 2016/0024981 A1* | 1/2016 | Parsels ............... F02D 41/0087 123/90.11 |
| 2016/0061127 A1 | 3/2016 | Chen et al. |
| 2016/0109330 A1* | 4/2016 | Chen .................... F02D 35/024 73/114.05 |
| 2017/0101956 A1 | 4/2017 | Younkins et al. |
| 2017/0299466 A1 | 10/2017 | Chen et al. |
| 2017/0370804 A1 | 12/2017 | Chen et al. |

OTHER PUBLICATIONS

Written Opinion dated Feb. 23, 2016 from International Application No. PCT/US15/56732.

* cited by examiner

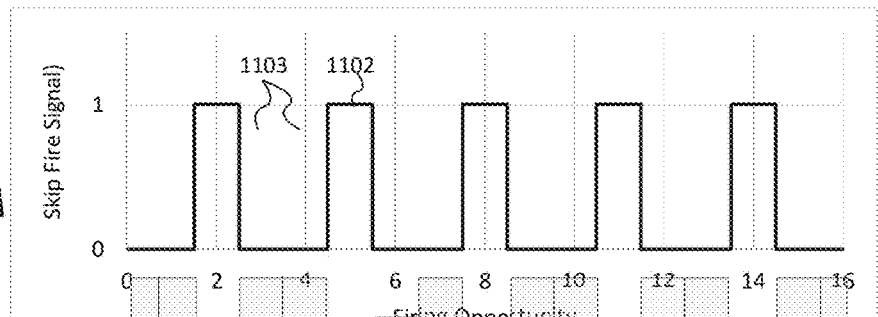
FIG. 11A
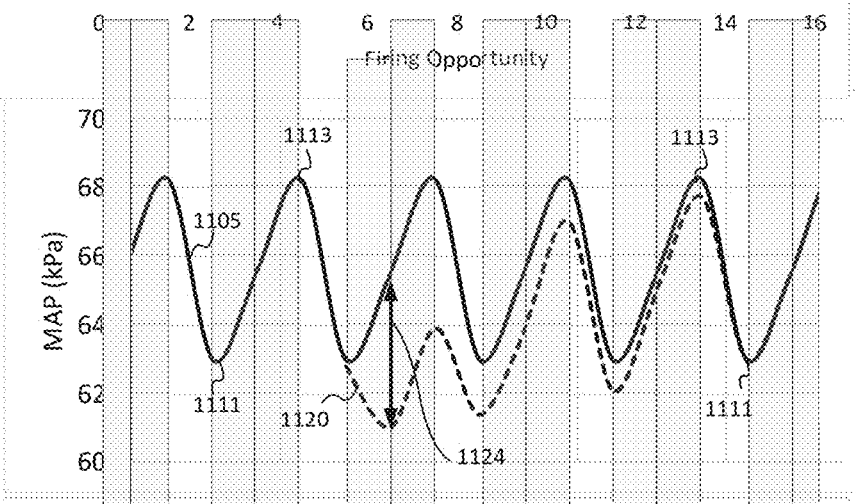
FIG. 11B
FIG. 11C
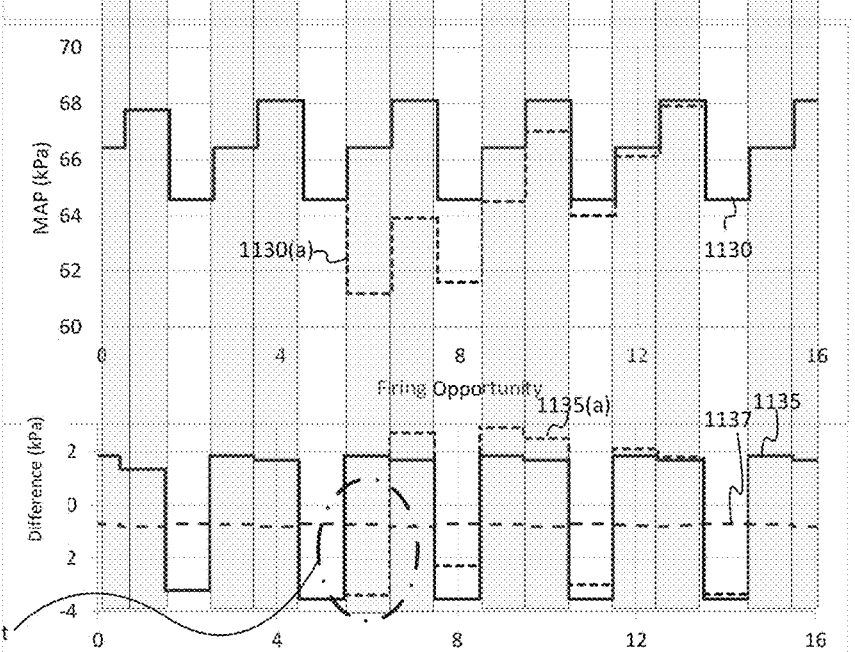
FIG. 11D
FIG. 11E
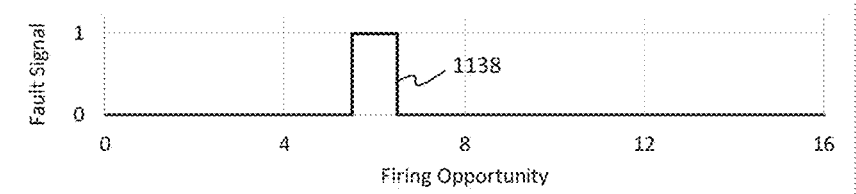

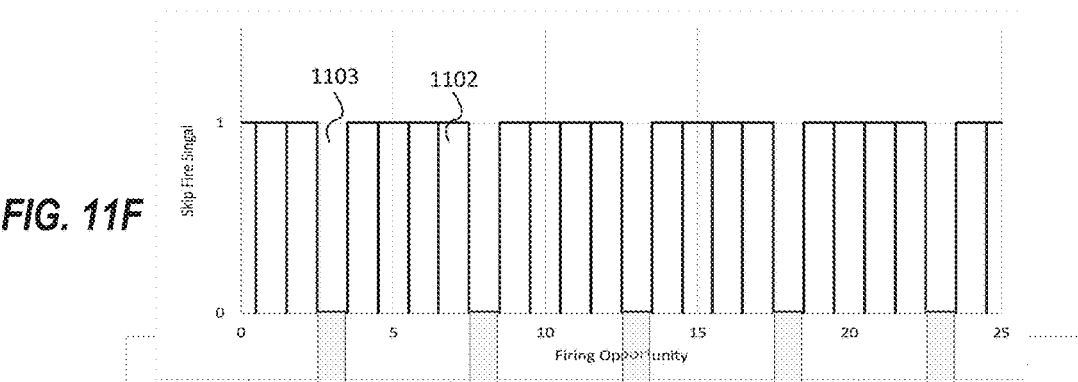
FIG. 11F
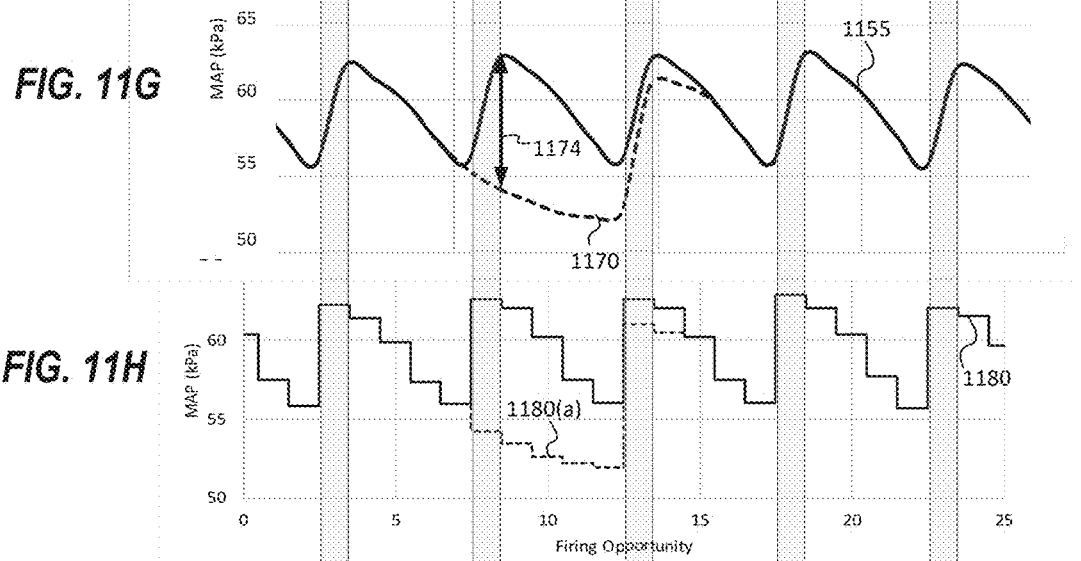
FIG. 11G
FIG. 11H
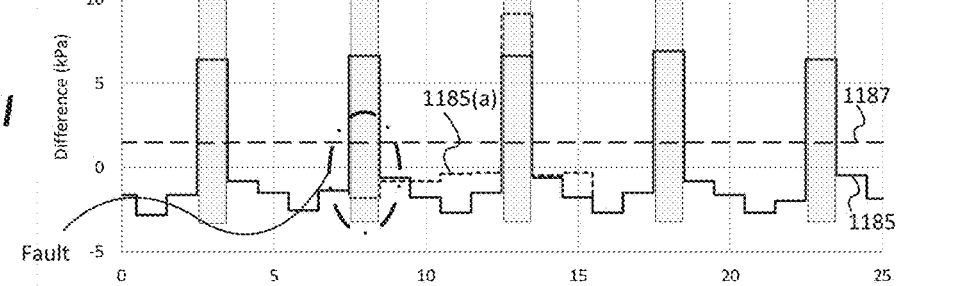
FIG. 11I
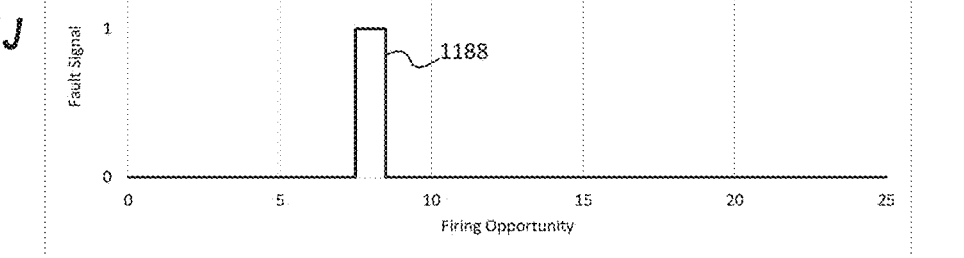
FIG. 11J FIG. 13A — Table 1301

|  | Engine Speed, rpm | | | | | |
|---|---|---|---|---|---|---|
| MAP Pressure Ratio | | 500 | 1000 | 1500 | 2000 | 2500 | 3500 |
| 0.20 | -0.2 | -0.2 | -0.1 | 0 | 0.1 | 0.1 |
| 0.40 | -0.4 | -0.4 | -0.3 | -0.2 | 0 | 0 |
| 0.60 | -0.6 | -0.6 | -0.5 | -0.4 | -0.2 | -0.2 |
| 0.80 | -0.7 | -0.7 | -0.7 | -0.6 | -0.4 | -0.4 |
| 0.85 | -0.9 | -0.9 | -0.8 | -0.7 | -0.6 | -0.6 |
| 0.90 | -1 | -1 | -0.9 | -0.8 | -0.7 | -0.7 |
| 0.95 | -1 | -1 | -1 | -0.9 | -0.8 | -0.8 |
| 1.00 | -1 | -1 | -1 | -1 | -0.9 | -0.9 |

FIG. 13B — Table 1321

| Firing Fraction | # of Preceeding Skipped Cycles | | | | | |
|---|---|---|---|---|---|---|
|  | 0 | 1 | 2 | 3 | 4 | 6 |
| 0.00 | -0.7 | -0.8 | -0.9 | -1.0 | -1.1 | -1.2 |
| 0.1667 | -0.6 | -0.7 | -0.8 | -0.9 | -1.0 | - |
| 0.20 | -0.5 | -0.6 | -0.7 | -0.8 | - | - |
| 0.25 | -0.4 | -0.5 | -0.6 | - | - | - |
| 0.3333 | -0.2 | -0.3 | - | - | - | - |
| 0.40 | 0 | -0.1 | - | - | - | - |
| 0.50 | 0.4 | - | - | - | - | - |
| 0.60 | 0.8 | - | - | - | - | - |
| 0.6667 | 1.2 | - | - | - | - | - |
| 0.7500 | 1.6 | - | - | - | - | - |
| 0.80 | 2 | - | - | - | - | - |
| 0.99 | 2 | - | - | - | - | - |

INDUCTION DIAGNOSTICS FOR SKIP FIRE ENGINES

CROSS REFERENCE TO RELATED APPLICATIONS

This application is a Continuation-in-Part of U.S. application Ser. No. 15/641,097, filed Jul. 3, 2017, which is a Divisional of U.S. application Ser. No. 14/919,385 (now U.S. Pat. No. 9,835,522), filed Oct. 21, 2015, which claims priority of Provisional Application No. 62/067,873 filed on Oct. 23, 2014. Each of the foregoing applications is incorporated herein by reference in its entirety.

FIELD

The present invention relates generally to methods and mechanisms for diagnosing induction faults in an internal combustion engine. Various embodiments involve measurement and analysis of the intake manifold pressure and/or crankshaft angular acceleration to diagnose induction faults.

BACKGROUND

Most vehicles in operation today are powered by internal combustion (IC) engines. Internal combustion engines typically have multiple cylinders or other working chambers where combustion occurs. The power generated by the engine depends on the amount of fuel and air that is delivered to each working chamber.

Fuel efficiency of internal combustion engines can be substantially improved by varying the engine displacement. This allows for the full torque to be available when required, yet can significantly reduce pumping losses and improve thermal efficiency by using a smaller displacement when full torque is not required. The most common method today of implementing a variable displacement engine is to deactivate a group of cylinders substantially simultaneously. In this approach the intake and exhaust valves associated with the deactivated cylinders are kept closed and no fuel is injected when it is desired to skip a combustion event. For example, an 8 cylinder variable displacement engine may deactivate half of the cylinders (i.e. 4 cylinders) so that it is operating using only the remaining 4 cylinders. Commercially available variable displacement engines available today typically support only two or at most three displacements.

Another engine control approach that varies the effective displacement of an engine is referred to as "skip fire" engine control. In general, skip fire engine control contemplates selectively skipping the firing of certain cylinders during selected firing opportunities. Thus, a particular cylinder may be fired during one engine cycle and then skipped during the next engine cycle and selectively skipped or fired during the next. In this manner, even finer control of the effective engine displacement is possible. For example, firing every third cylinder in a 4 cylinder engine would provide an effective reduction to $\frac{1}{3}^{rd}$ of the full engine displacement, which is a fractional displacement that is not obtainable by simply deactivating a set of cylinders to create an even firing pattern. Similarly, firing every other cylinder in a 3 cylinder engine would provide an effective displacement of $\frac{1}{2}$, which is not obtainable by simply deactivating a set of cylinders. Conceptually, virtually any effective displacement can be obtained using skip fire control, although in practice most implementations restrict operation to a set of available firing fractions, sequences or patterns.

The Applicant, Tula Technology, Inc., has filed a number of patents describing various approaches to skip fire control. By way of example, U.S. Pat. Nos. 8,099,224; 8,464,690; 8,651,091; 8,839,766; 8,869,773; 9,020,735; 9,086,020; 9,120,478; 9,175,613; 9,200,575; 9,200,587; 9,291,106; 9,399,964, and others describe a variety of engine controllers that make it practical to operate a wide variety of internal combustion engines in a dynamic skip fire operational mode. Each of these patents and patent applications is incorporated herein by reference.

U.S. Pat. No. 8,131,445 (which is incorporated herein by reference) teaches a continuously variable displacement engine using a dynamic skip fire operational approach, which allows any fraction of the cylinders to be fired on average using individual cylinder deactivation. In a continuously variable displacement mode operated in skip-fire, the amount of torque delivered generally depends heavily on the firing fraction, or fraction of combustion events that are not skipped. In other skip fire approaches a particular firing pattern or firing fraction may be selected from a set of available firing patterns or fractions.

In some applications referred to as multi-level skip fire, individual working cycles that are fired may be purposely operated at different cylinder outputs levels—that is, using purposefully different air charge and corresponding fueling levels. By way of example, U.S. Pat. No. 9,399,964 (which is incorporated herein by reference) describes some such approaches. The individual cylinder control concepts used in dynamic skip fire can also be applied to dynamic multi-charge level engine operation in which all cylinders are fired, but individual working cycles are purposely operated at different cylinder output levels. Dynamic skip fire and dynamic multi-charge level engine operation may collectively be considered different types of cylinder output level modulation engine operation in which the output of each working cycle (e.g., skip/fire, high/low, skip/high/low, etc.) is dynamically determined during operation of the engine, typically on an individual cylinder working cycle by working cycle (firing opportunity by firing opportunity) basis. It should be appreciated that cylinder output level engine operation is different than conventional variable displacement in which when the engine enters a reduced displacement operational state, a defined set of cylinders are operated in generally the same manner until the engine transitions to a different operational state.

In order to operate with dynamic skip fire control or other types of cylinder output level modulation, it is necessary to control the intake and exhaust valves in a more complex manner than if the cylinders are always activated. For example, in skip fire operation, the intake and/or exhaust valves remain closed during a skipped working cycle to minimize pumping losses. This contrasts with an engine operating on all cylinders, where the intake and exhaust valves open and close on every working cycle. Most vehicles in operation today use a camshaft to open and close the intake valves. The valve train may incorporate a cam phaser to control the timing of the valve opening and closing relative to the crankshaft. Some cam operated engines also have adjustable valve lift. For example, some engines have mechanisms to shift valves between a "high lift" and "low lift" level; for example, a maximum lift of 11 mm for "high lift" and of 4 mm for "low lift". As an alternative to cam controlled valves, some engines use electronic valve actuation, which has more flexibility in the valve opening and closing because the valve motion is not constrained by camshaft rotation.

For cam operated valves a method to deactivate a valve is to incorporate a collapsible valve lifter into the valve train. To activate the valve the lifter remains at its full extension and to deactivate the valve the lifter collapses failing to transfer the cam lobe profile to the valve. Valve activation/deactivation is controlled by a solenoid which deactivates the valve by providing high pressure oil to the collapsible lifter. Other mechanisms exist to deactivate valves in engines with cam operated valves.

U.S. Pat. Nos. 9,175,613, 9,581,097, and 9,562,470, each of which is incorporated herein by reference in their entireties, teach methods of sensing failures of an exhaust valve to open after a combustion event. As pointed out in these applications, failure of the exhaust valve to open will result in high pressure combustion gases being trapped in the cylinder, which can lead to damage of the intake valve and its associated mechanism if it attempts to open against this high pressure.

Failures of an intake valve to activate or deactivate under skip fire control can also have a deleterious impact on engine operation. Failure of the intake valve to open will result in missing a planned firing event. This may lead to unburnt hydrocarbons being transmitted to the engine exhaust and may result in unacceptable emissions. There will also be a loss of engine torque and increased engine roughness. Failure of an intake valve to close may result in increased pumping losses and excess oxygen in the exhaust gases deleteriously impacting the catalytic converter. Failures in the cam adjustment mechanism can also lead to emission and engine performance issues. In all cases information regarding intake valve or cam failures may be required to be communicated to a vehicle on-board diagnostic (OBD) system to satisfy governmental regulations, such as those imposed by the California Air Resources Board (CARB). It is thus desirable to make a determination of whether actual cylinder air induction accurately matches the commanded operation.

SUMMARY OF THE INVENTION

A variety of methods, diagnostic modules and other arrangements for detecting air induction faults during operation of an internal combustion engine are described. In some embodiments, the intake manifold pressure is monitored with the intake pressure being read for each induction opportunity. Induction faults may be detected based at least in part on a comparison of the manifold pressure readings for sequential induction opportunities. In some embodiments, an induction fault is identified when the difference between the manifold pressure associated with an induction opportunity and the immediately preceding induction opportunity exceeds an induction fault threshold.

In some embodiments, the induction fault threshold is based at least in part on at least one of: (i) how many air induction opportunities were skipped immediately before the current air induction opportunity; (ii) an intake manifold pressure ratio; (iii) a current operational firing fraction of the engine; and (iv) a current engine speed.

In some embodiments, a lookup table may be used to identify the induction fault threshold suitable for use under current operating conditions.

In some embodiments, each manifold pressure reading is based on a plurality of pressure measurement samples. In some embodiments, each manifold pressure reading is made at substantially the same phase in a working cycle associated with its associated induction opportunity. In some embodiments, the manifold pressure reading as made at a phase that is in the range of 120° to 180° after top dead center of the piston in the associated intake stroke—as for example, near 150° after top dead center.

The describe approaches are particularly well suited for use in engines operating in a skip fire mode with cylinder deactivation and/or other dynamic cylinder output level modulation modes.

A variety of different induction faults can be detected using the described techniques including intake valve activation failures, intake valve deactivation failures, and valve lift faults (e.g., valve lift too low and/or valve lift too high induction faults).

Once and induction fault is identified, it may be acted on in any appropriate manners. In some embodiments, the fault is logged in a diagnostic fault log. When appropriate, the control of the engine can be varied based on detected fault, as for example, by avoiding use of a cylinder that is consistently faulting or by disabling skip fire operation of the engine until the problem is fixed.

In another aspect, various specific induction fault lookup tables are described. The induction fault tables may be embodied in a computer readable medium associated with an engine controller for use in identifying air induction faults. In some embodiments, the induction fault lookup table include a multiplicity of entries that identify induction fault thresholds. Indices for the lookup table may include one or more of: (i) a number of skipped induction opportunities that immediately preceded a current induction opportunity, (ii) an intake manifold pressure ratio, (iii) an operational firing fraction, and (iv) an engine speed.

In other embodiments, the an additional index for the lookup table may include one of: (v) a skip frequency indicative of a number of induction skips that are expected to occur in a designated period of time; (vi) a throttle position; (vii) the intake manifold pressure; (vii) cam phase; (viii) the intake valve lift profile; (ix) boost pressure; and the skip/fire decision for the next firing opportunity.

In some embodiments that induction fault lookup table may be a composite table formed from a plurality of lookup table segments.

A variety of diagnostic modules capable of performing the functions described above are also described.

BRIEF DESCRIPTION OF THE DRAWINGS

The invention and the advantages thereof, may best be understood by reference to the following description taken in conjunction with the accompanying drawings in which:

FIGS. 11A-11E are a series of graphs illustrating variations in manifold pressure that may occur during skip fire operation at a firing fraction of ⅓ and the generation of a fault signal based thereon.

FIGS. 11F-11J are a series of graphs illustrating variations in manifold pressure that may occur during skip fire operation at a firing fraction of ⅘ and the generation of a fault signal based thereon.

FIGS. 13A and 13B are induction fault threshold lookup tables suitable for use in determining an induction fault in accordance with an embodiment. The table of FIG. 13A utilizes intake manifold pressure ratio and engine speed as indices. The table of FIG. 13B utilizes firing fraction and the number of skipped induction events that immediately preceded the current induction as indices.

In the drawings, like reference numerals are sometimes used to designate like structural elements. It should also be appreciated that the depictions in the figures are diagrammatic and not to scale.

DETAILED DESCRIPTION

Figure 1:
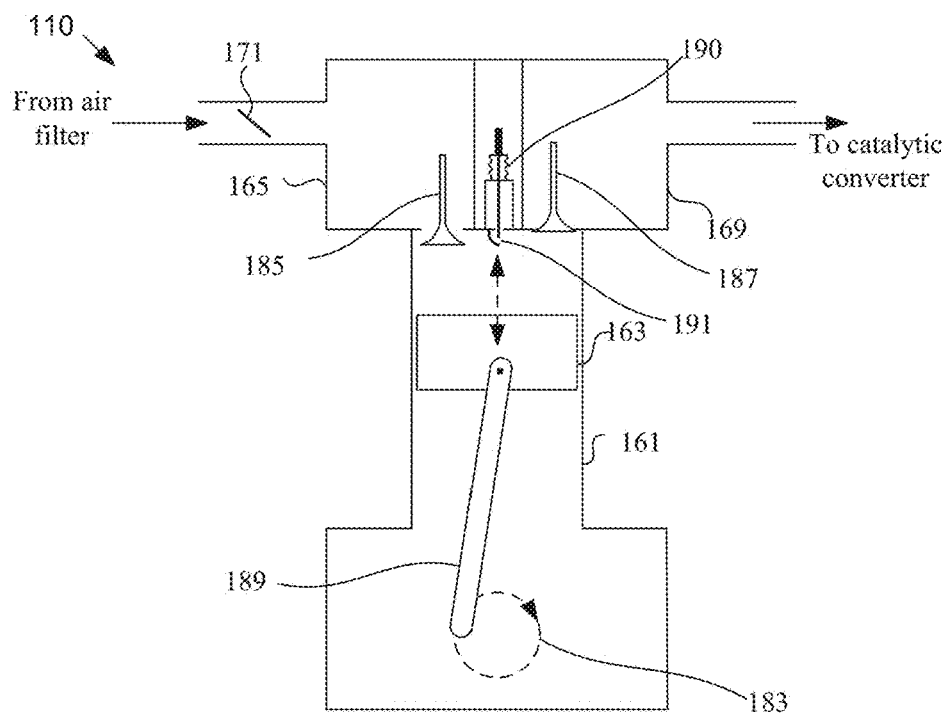
FIG. 1 is a schematic diagram showing a portion of one cylinder of an internal combustion engine.

The present invention is a method and apparatus to determine failures of air induction in an internal combustion engine. Induction failures may arise from intake valve activation or deactivation failures or improper response to valve lift commands. The invention is particularly useful for skip fire controlled internal combustion engines because of the frequent cylinder activation/deactivation inherent in skip fire operation. In some embodiments an algorithm uses intake manifold absolute pressure to determine if an intake valve has been actuated properly according to its commanded state. In other embodiments an algorithm uses intake manifold absolute pressure to determine if the cam valve lift setting has been actuated properly according to its commanded state. In other embodiments the same functions can be determined using measurement of the crankshaft angular acceleration or time derivatives thereof. In still further embodiments these methods can be combined to provide a more robust diagnostic. The diagnostic techniques described herein improve engine efficiency, reduce noxious emissions and lower the risks of degradation to engine components. The techniques are able to detect a fault in the same engine cycle that it occurs and determine which cylinder has the fault.

In general, dynamic skip fire engine control contemplates selectively skipping the firing of certain cylinders during selected firing opportunities. Thus, for example, a particular cylinder may be fired during one firing opportunity and then may be skipped during the next firing opportunity and then selectively skipped or fired during the next. The fire/skip decision may be made on a firing opportunity by firing opportunity basis and the firing controller typically includes an accumulator functionality that tracks the portion of a firing that has been requested but not yet delivered, or delivered, but not yet requested. This decision is typically made some number of firing opportunities prior to the firing event to allow the control system time to correctly schedule the engine for either a skip or fire event. Skip fire control contrasts with conventional variable displacement engine operation in which a fixed set of the cylinders are deactivated during certain low-load operating conditions.

When a cylinder is deactivated in a variable displacement engine, its piston typically still reciprocates, however neither air nor fuel is delivered to the cylinder so the piston does not deliver any net power over an engine cycle. Since the cylinders that are "deactivated" do not deliver power, the proportionate load on the remaining cylinders is increased, thereby allowing the remaining cylinders to operate at an improved thermodynamic efficiency. With skip fire control, cylinders are also preferably deactivated during skipped working cycles in the sense that air is not pumped through the cylinder and no fuel is delivered during skipped working cycles. This requires a valve deactivation mechanism where the intake and exhaust valves of a cylinder remain closed during a working cycle. In this case, no air is inducted into the deactivated cylinders during the skipped working cycles thereby reducing pumping losses.

FIG. 1 illustrates a cylinder of an internal combustion engine 110 that includes a cylinder 161, a piston 163, an intake manifold 165, spark plug 190, and spark gap 191 and an exhaust manifold 169. A throttle valve 171 controls the inflow of air from an air filter or other air source into the intake manifold. Air is inducted from the intake manifold 165 into cylinder 161 through an intake valve 185. Fuel is added to this air either by port injection or direct injection into the cylinder (not shown in FIG. 1). Combustion of the air/fuel mixture is initiated by a spark present in the spark gap 191. Expanding gases from combustion increase the pressure in the cylinder and drive the piston 163 down. Reciprocal linear motion of the piston is converted into rotational motion by a connecting rod 189, which is connected to a crankshaft 183. Combustion gases are vented from cylinder 161 through an exhaust valve 187.

A camshaft (not shown in FIG. 1) may be used to move the intake and exhaust valves synchronously with the crankshaft rotation. The rotating camshaft regulates opening and closing of the intake and exhaust valves. The camshaft includes cam lobes that each have a profile, which is associated with a valve lift schedule. The valve lift schedule includes an amount of time a valve is open (i.e. duration) and a magnitude or degree to which the valve opens (i.e. lift). Valve phasing relative to the crankshaft may be controlled by a cam phaser (not shown in FIG. 1). Some engines employ valve trains that allow for variable valve lift. The valve lift may be either continuously controlled or step-wise selectable, for example two or three steps. Variable lift on the intake valve can reduce pumping losses and can facilitate improved combustion through better air/fuel gas dynamics.

Figure 2:
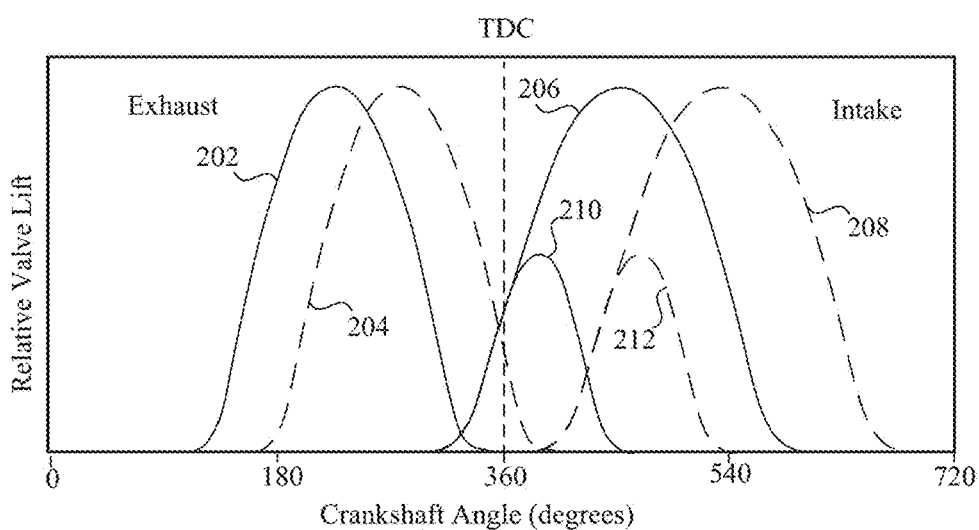
FIG. 2 is a representative plot of valve lift versus crankshaft angle.

FIG. 2 illustrates the valve lift profile associated with a two step valve schedule. Curves 202 and 204 illustrate an exhaust valve lift profile associated with extremes of exhaust valve timing phase adjustment. Curves 206 and 208 illustrate an intake valve lift profile associated with extremes of intake valve timing phase adjustment for the "high lift" schedule. Curves 210 and 212 illustrate the intake valve lift profile associated with extremes of intake valve timing phase adjustment for the "low lift" schedule. The solid curves, 202, 206, and 210 represent the valve lift profile associated with maximum cam phaser advance. The dashed curves 204, 208, and 212 represent the valve lift profile associated with maximum cam phaser retardation.

Figure 3:
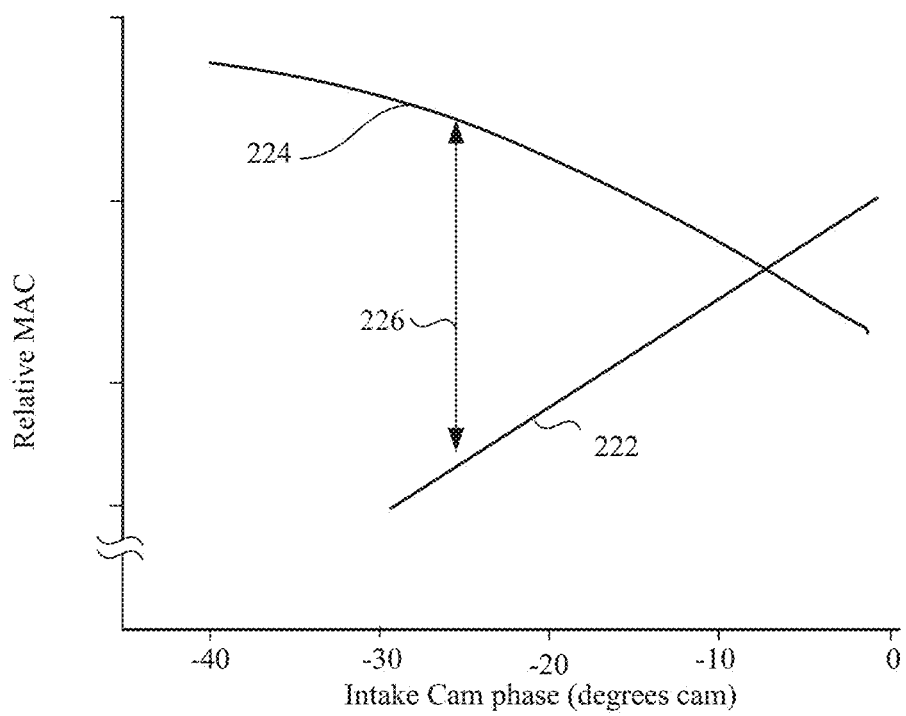
FIG. 3 is a representative plot of cylinder mass air charge (MAC) versus cam angle for a high lift and low lift valve schedule.

FIG. 3 illustrates the resultant amounts of air induction for different cam phaser and valve lift schedules. Generally, the "low lift" schedule 222 inducts less air into a cylinder than the "high lift" schedule 224. This difference in the amount of inducted air 226 can be detected using the diagnostics described herein. The amount of inducted air will also vary with the MAP and engine speed. Changes in the inducted air mass, i.e. mass air charge (MAC), will impact the intake manifold pressure and the crankshaft angular acceleration. These changes can be sensed by the diagnostic apparatus and methods described herein and used to determine whether the amount of inducted air substantially matches the commanded values. If the measured values deviate by more than a prescribed threshold, a fault signal may be generated.

Figure 4:
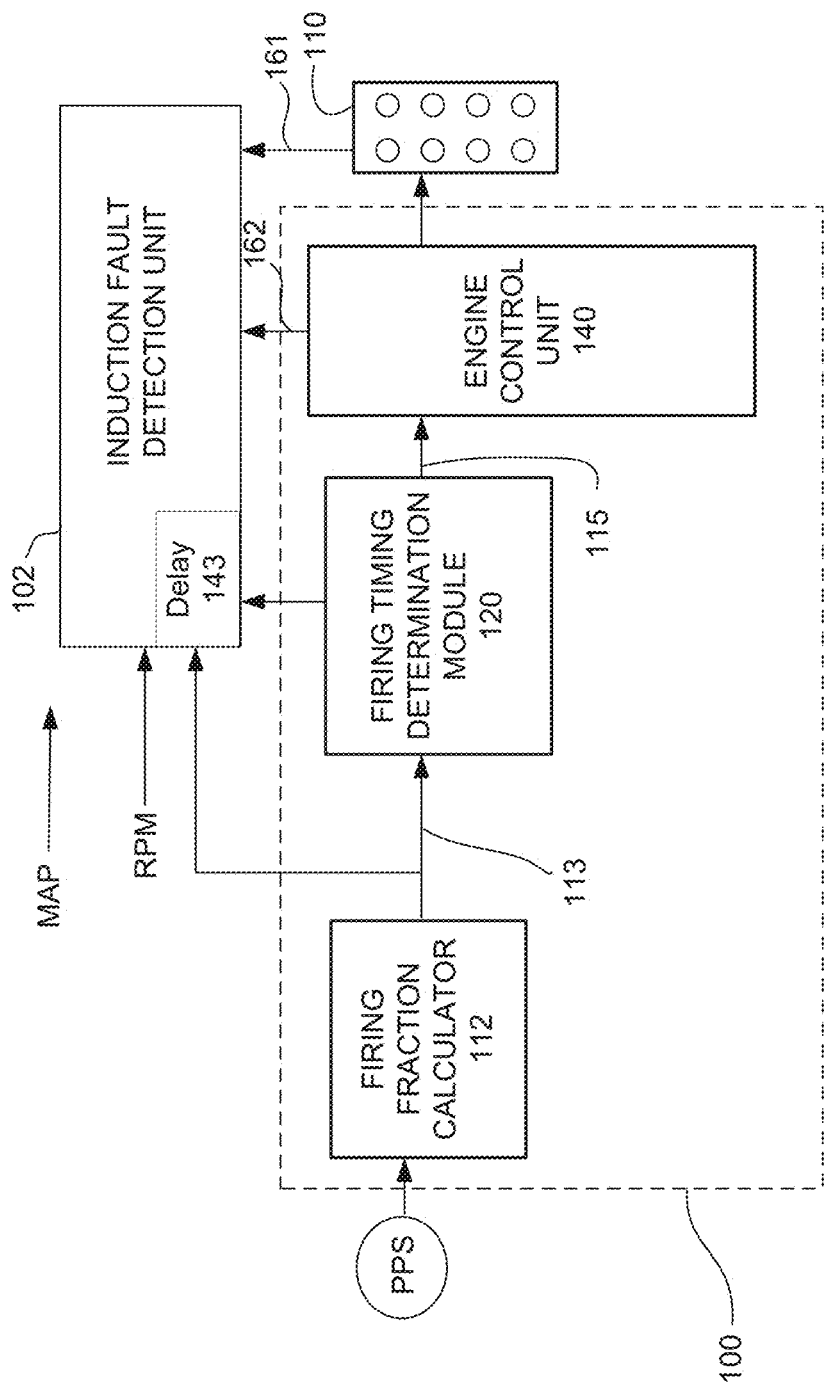
FIG. 4 is a block diagram of an engine controller and an induction fault detection unit according to a particular embodiment of the present invention.

Referring to FIG. 4, an engine controller 100 according to a particular embodiment of the present invention will be described. The engine controller 100 includes a firing fraction calculator 112, a firing timing determination module 120, an engine control unit 140, and an induction fault detection unit 102.

Initially, the firing fraction calculator 112 receives an input signal that is treated as a request for a desired engine output. The firing fraction calculator 112 is arranged to determine a firing fraction, firing sequence, firing pattern or firing density that would be appropriate to deliver the desired output under selected operating conditions. The firing fraction is indicative of the fraction or percentage of firings under the current (or directed) operating conditions that are required to deliver the desired output. The firing fraction calculator generates a commanded firing fraction 113, which is received by the firing timing determination module 120 and the induction failure detection unit 102.

The firing timing determination module 120 is arranged to issue a sequence of firing commands (e.g., drive pulse signal 115) that cause the engine to deliver the percentage of firings dictated by the commanded firing fraction 113. The sequence of firing commands output by the firing timing determining module 120 is passed to an engine control unit (ECU) 140 which orchestrates the actual firings. The firing timing determination module 120 is arranged to deliver a wide variety of firing information to the induction fault detection unit 102. This may include, but is not limited to, the drive pulse signal 115 or a firing sequence, a firing decision for a particular working chamber, a signal indicating the number or identity of that working chamber, and/or the firing history of a selected working chamber. In various applications, this information can be directly sent between the induction fault detection unit 102 and the firing timing determination module 120 or the induction fault detection unit 102 may be able to infer this information. For example, if the firing timing determination module 120 sends a fire/skip signal to the induction fault detection unit 102 additional information on the cam schedule and phase may be sent over signal lines 161 and 162. These two pieces of information, the fire/skip decision and the valve schedule would allow the induction fault detection unit 102 to determine which cylinder is being fired/skipped and the expected MAC associated with the firing opportunity (should it be a fire). The induction failure detection unit 102 may include a delay block 143, which compensates for delays between the commanded valve actuation signal 115 and/or signal 113 and the actual valve movement. In should be appreciated that the engine controller shown in FIG. 4 can be configured in multiple ways; for example the induction failure detection unit 102 may be integrated into engine controller 100.

An advantage of many skip fire engine approaches is that information about future firing decisions is known before the firings actually take place. Various implementations of the present invention take advantage of this feature. More specifically, firing information is used in a wide variety of ways to estimate the anticipated fluctuations in the MAP and/or crank acceleration. Comparison can then be made whether the observed fluctuations are consistent with the estimated fluctuations. If the observed fluctuations exceed a defined range from the estimated fluctuation a fault indication may result. The induction failure detection unit 102 can be used to detect faults in the intake valves and valve lift level. Although the present invention contemplates the use of dynamic skip fire engine control, this should not be considered limiting. The invention may be used in an engine operating on all cylinders or a variable displacement engine, i.e. fixed displacement levels. These control systems generally have more evenly spaced induction events than a skip fire controlled engine, although the amount of inducted air may vary more than in skip fire control.

The assignee of the present application has filed multiple patent applications on a wide variety of skip fire and other engine designs, such as U.S. Pat. Nos. 7,954,474; 7,886,715; 7,849,835; 7,577,511; 8,099,224; 8,131,445; and U.S. Pat. Nos. 8,131,447; 8,616,181; 8,701,628; 9,120,478, 9,200,587, 9,239,037, 9,273,643 and 9,650,971, each of which is incorporated herein by reference in its entirety for all purposes. Many of the aforementioned applications describe firing controllers, firing fraction calculators, filters, power train parameter adjusting modules, firing timing determining modules, and other mechanisms that may be integrated into or connected with the engine controller 100 and the induction failure detection unit 102.

Intake Manifold Pressure Based Diagnostics

In some embodiments an algorithm using information on the intake manifold absolute pressure (MAP) can be used to determine induction faults. The variations in the MAP may result from the superposition of multiple components: (1) a possibly steady slowly varying average manifold pressure used to regulate average cylinder charge, (2) a slowly varying component reflecting driver input or—in the case of a skip firing engine, the faster increase and decay of average manifold pressure in response to firing density changes, (3) higher frequency waves that are intake manifold natural resonances excited by separate inductions, much as a bell is excited by separate blows, and finally (4) waves excited by individual inductions or missing inductions.

Figure 5A:
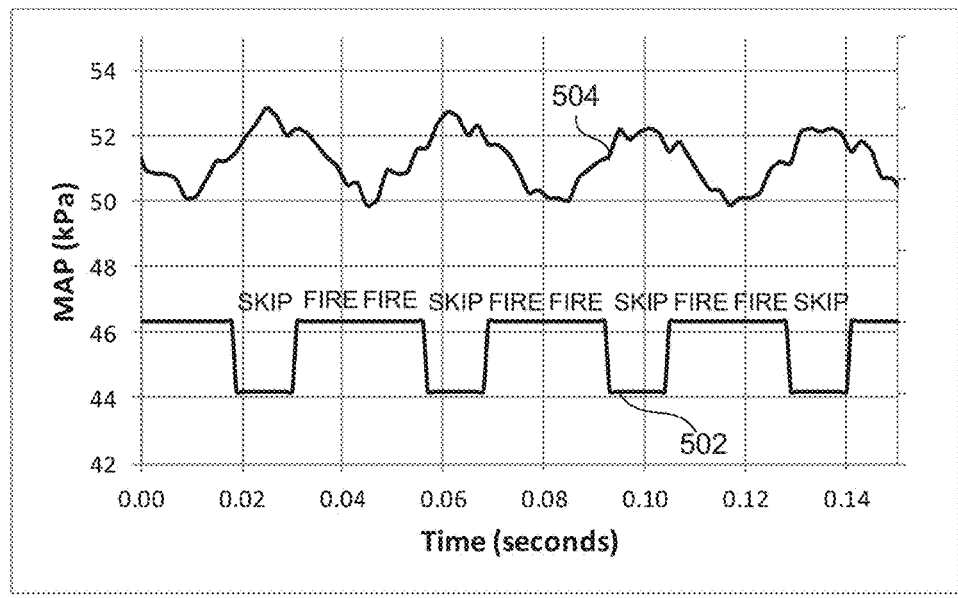
FIG. 5A is a representative plot of intake manifold absolute pressure (MAP) and firing enable signal versus time during normal skip fire operation.

FIG. 5A plots the measured MAP over a number of firing opportunities for an eight cylinder engine operating in skip fire mode at 1250 rpm and a firing fraction of ⅔. A firing fraction of ⅔ results in a fire-fire-skip-fire . . . pattern evident as the high to low variation in the fire enable signal 502. The measured MAP may be determined by one or more pressure sensors situated in an intake manifold. The MAP sensor(s) have a natural bandwidth of greater than 1 kHz. FIG. 5A shows a regular pattern in the measured MAP 504. Induction of air into a cylinder during a firing event results in a MAP drop. Conversely, the absence of air induction, associated with a cylinder skip, results in a MAP increase during a skipped induction event.

Figure 5B:
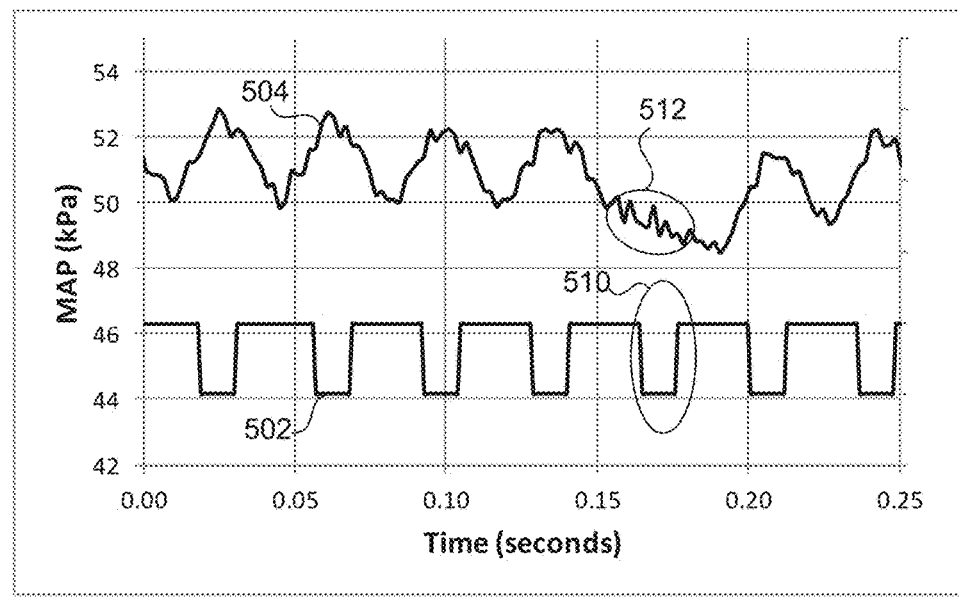
FIG. 5B is a representative plot of intake manifold absolute pressure (MAP) and firing enable signal versus time during an induction fault.

If an engine is operating with a regular firing pattern like that shown in FIG. 5A, an induction failure will be evident as a deviation from that pattern. FIG. 5B shows the same operating conditions as in FIG. 5A except that a cylinder failed to deactivate during a commanded skip event 510. Instead of rising, there is a continued drop in MAP 512. This break in the MAP signal pattern can be detected and used as an induction fault diagnostic.

Figure 6:
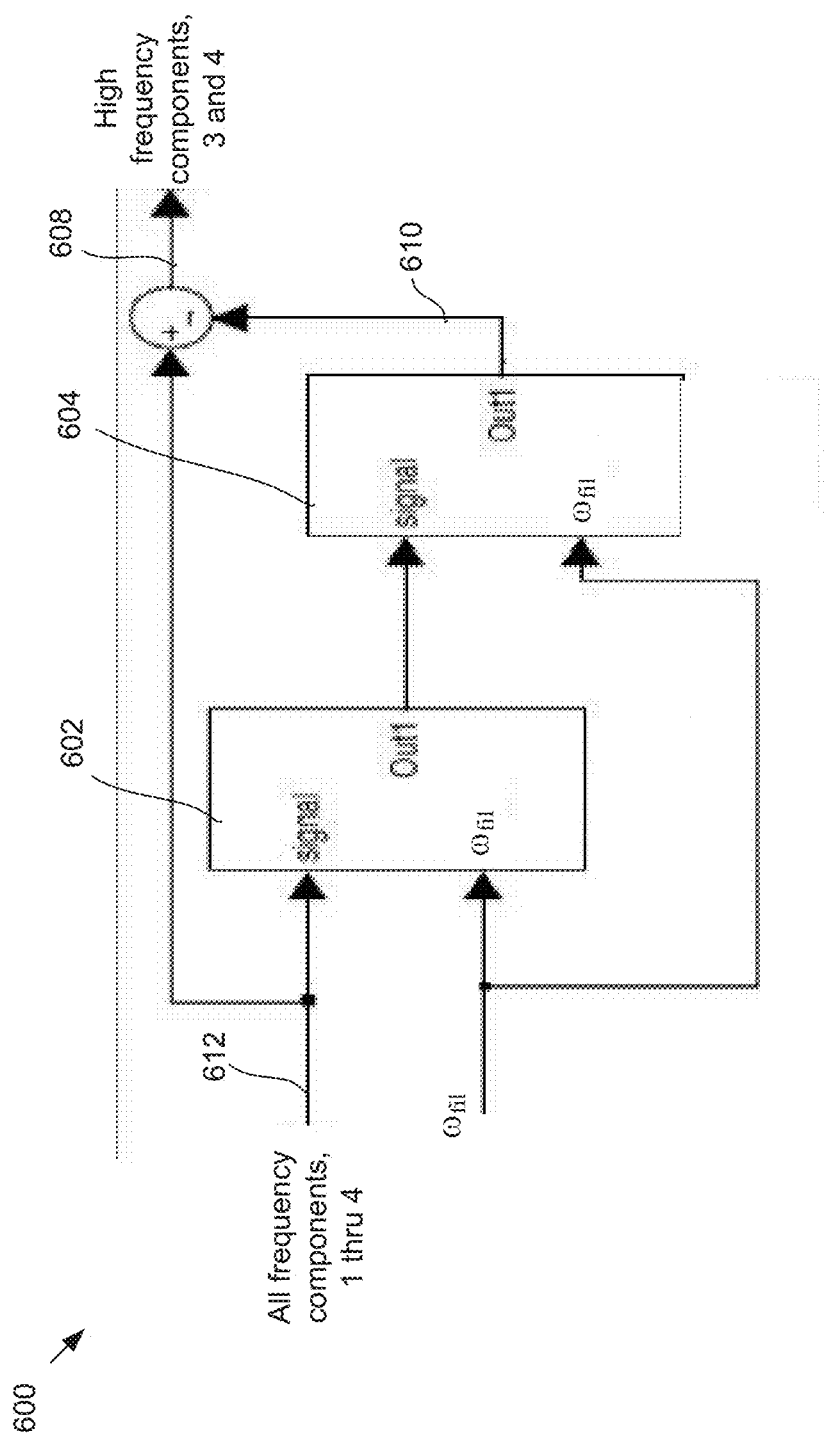
FIG. 6 is a block diagram of a diagnostic filter circuit according to a particular embodiment of the present invention.

FIG. 6 shows a diagnostic filter 600 that may be used to separate low frequency MAP signal components (1) and (2) from higher frequency components (3) and (4). The filtered output 608 has substantially reduced the low frequency signal components compared to the MAP signal input 612. Removing the low frequency components makes subsequent diagnostic thresholding and logic simpler, as their time scale is far different than signals caused by (3) or (4). The last component (4) due to commanded inductions or deactivations can be compared to their expected value and used to diagnose proper induction behavior, i.e. was the cylinder skip/fire executed as commanded and/or was the valve lift schedule executed as commanded. The diagnostic filter used may be built by filtering the input signal 612 using two identical cascaded first order low pass filters 602 and 604 and then subtracting this output 610 from the input signal 612 as shown in FIG. 6. This architecture results in an output filtered signal 608 without any DC offset and reduced low frequency content. Diagnostic filter 600 may be referred to a complementary filter, since it separates out and isolates high frequency components from the overall signal. This filter has minimal phase delay, which allows detection of an induction fault during the same engine cycle as the fault occurs. While the filter structure shown in FIG. 6 works well it is not the only form possible, and other types of low pass filter structures may be used.

The $\omega_{fil}$ input to first low pass filter 602 and second low pass filter 604 is based on the intake manifold cutoff frequency, the inverse of the manifold filling or emptying exponential time constant. The manifold's 3 dB cutoff frequency $\omega_{man}$, may be determined from the manifold dimensions and dynamic response or some other means. The frequency $\omega_{fil}$ may be a multiple, K, of the manifold's 3 dB cutoff frequency $\omega_{man}$ and K may be on the order of 10. The constant K depends on various engine parameters such as, but not limited to, manifold volume, total engine displacement, and number of cylinders. It also may vary as a function of engine parameters such as, but not limited to, cam angle, valve lift schedule, and engine speed. It also may vary with the control implementation architecture such as a discrete or continuous implementation. As mentioned previously, subtraction of the output 610 from the initial signal 612 results in an output filtered signal 608 with no DC and lower frequency components, concentrating diagnosis on higher frequency components induced by valve operation faults. The diagnostic filter 600 uses $\omega_{fil}$ to lessen the effect of low frequency pressure variation from driver input and low frequency filling and emptying disturbances. This aids in the application of a threshold because the filter output produces large positive deviations at a fault. A positive deviation produced by a fault will exceed the applied threshold.

Figure 7A:
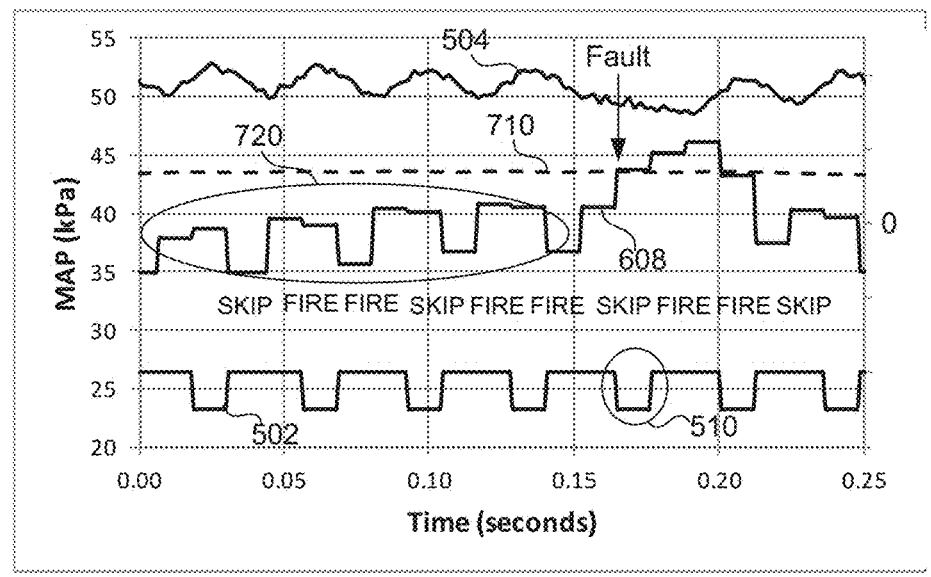
FIG. 7A is a representative plot of an output of a diagnostic filter according to an embodiment of the present invention.

FIG. 7A shows the resultant diagnostic filter output 608 derived from MAP signal 504 shown in FIG. 5B. Also included for reference in FIG. 7A is the MAP signal 504 and fire enable signal 502. Region 720 represents a fault free region where the engine is properly executing induction commands from the engine controller. Once again the commanded skip event 510 fails to deactivate the intake valve and the cylinder experiences an induction event. When this fault occurs the diagnostic filter output 608 exceeds a threshold 710 generating an induction fault signal (not shown in FIG. 7A). Note that filter output 608 has an average value near zero (reference on right side vertical axis in FIG. 7A).

The fault diagnostic apparatus and method described above work well for engines operating with repetitive firing patterns; however, it may not be robust under dynamic skip fire operation. Dynamic skip fire operation is quite different from the operation in a more conventional engine, in which each working chamber is steadily fired; for example, once every two engine revolutions for a 4 stroke engine. Because dynamic skip fire engine control can involve different working chambers with different firing sequences, there is a greater likelihood of complex MAP behavior especially during transient operation when the firing fraction is changing.

Figure 7B:
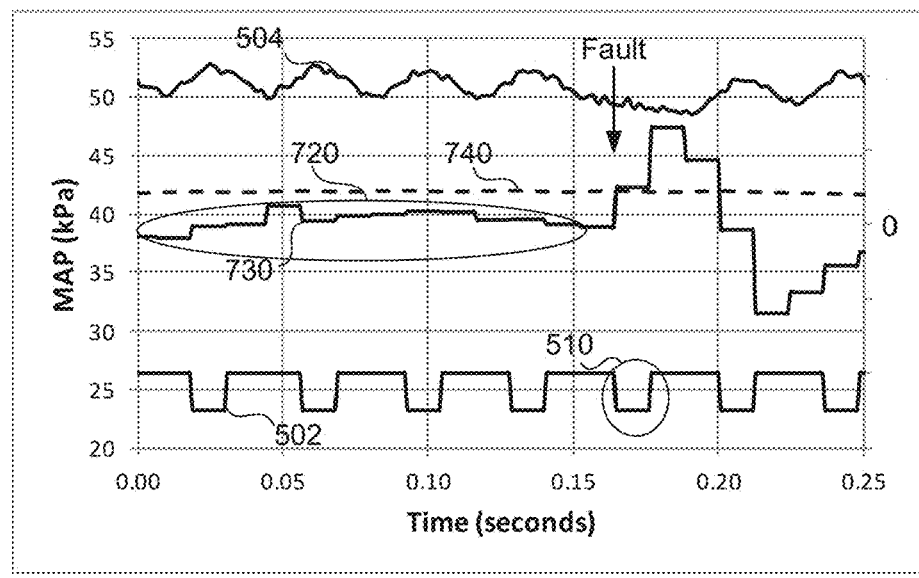
FIG. 7B is a representative plot of an output signal indicating an induction fault according to an embodiment of the present invention.

Since the filtered output 608 drifts in transient engine operation and may result in false fault indications, improved fault detection can be achieved by applying additional processing to the filtered output 608. The results of this approach are shown in FIG. 7B. This figure is similar to FIG. 7A with common designators, except with the filtered output 608 has been replaced by an output signal 730 and the thresholds 710 and 740 may be different. In FIG. 7B an induction fault is detected once the output signal 730 exceeds the threshold 740. Again, note that filter output 730 has an average value near zero (reference on right side vertical axis in FIG. 7B).

Figure 8:
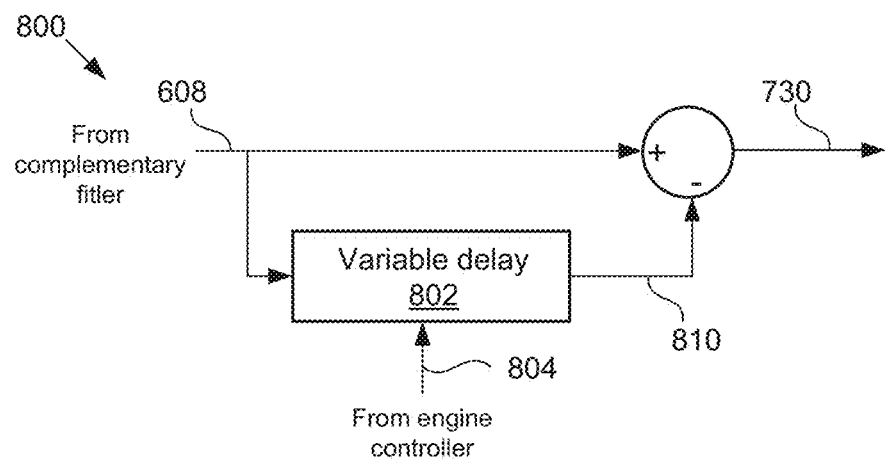
FIG. 8 is a block diagram of a system to produce an output signal indicative of induction faults according to an embodiment of the present invention.

Output signal 730 may be produced using a system shown in FIG. 8. FIG. 8 is a schematic diagram of a system 800 that takes as inputs filtered output 608 from the diagnostic filter 600 and firing information from the engine controller 100 (shown in FIG. 4). The system 800 takes the difference between the filtered output 608 and a delayed version of that signal 810 to produce an output signal 730. The amount of delay is determined by variable delay block 802, which has as an input firing information 804 from the engine controller. In one embodiment input firing information 804 includes the operating firing fraction. The time delay interval applied by time delay block 802 may be the firing fraction denominator multiplied by the period between firing opportunities. This effectively produces an output signal 730 that compares the filtered output 608 behavior for the current firing opportunity with its value at the last similar firing opportunity, i.e. the same phase in the cyclic firing pattern. As shown in FIG. 7B there is less variation in the output signal 730 than filtered output 608 in the region of fault free operation 720. During transients the firing fraction may not be uniform, so the firing fraction denominator is not uniquely defined. In this case, the time delay chosen may be the most recent firing opportunity that has the same commanded induction conditions as the opportunity under test. This algorithm also has lower noise on the output signal 730 as compared to the filter output 608.

It should be appreciated that the rates of sampling and filtering may be adjusted to provide robust fault detection without excessive processing requirements. For example, the MAP signal may be delivered at 1 msec rate, while the diagnostic filter output 608 may update at a less frequent interval, such as 90 degrees of crank angle as depicted in FIGS. 7A and 7B. The sampling and processing rates may be based on time, crankshaft rotation (angle), or various combinations and permutations thereof. Also the threshold level for fault detection may be a variable based on engine MAP, engine speed, and other variables.

The preceding description of an induction fault detection apparatus and method has used an example of detecting an induction failure resulting from a commanded skip event erroneously resulting in an unintended cylinder induction event. The same methods and apparatus may be used with the appropriate adjustment of the thresholds to detect other types of induction failures, such as a fire command resulting in a skip, a high lift command resulting in a low lift or a low lift command resulting in a high lift. It should also be appreciated that other filtering methods may be used to isolate the fluctuations associated with specific induction opportunities and determine whether they match the predicted fluctuations.

Intake Manifold Pressure Sample(s) Based Diagnostics

In some alternative embodiments, the intake manifold pressure based diagnostics can be based on one or more specific samples without requiring any of the filtering described in conjunction with some of the preceding embodiments. The basis for such sample based diagnostics will be described with reference to FIGS. 11A-11J.

FIGS. 11A-11E are a series of graphs illustrating variations in manifold pressure that may occur during skip fire operation at a firing fraction of ⅓ and the generation of a fault signal based thereon. The graphs help to illustrate detection of a failure to deactivate an intake valve that should have been deactivated as part of a skipped firing opportunity, but instead activated due to a fault causing an induction event. Since the detected fault is a failure to deactivate, it can only occur on skipped firing opportunities. Skipped firing opportunities are highlighted in gray in FIGS. 11B-11D.

FIG. 11A shows a firing sequence that is generated when a firing fraction of ⅓ is used with most evenly spaced firings. In this figure, "1's" represent fire commands 1102 and "0"s" represent skip commands 1103. In FIGS. 11B-11E that follow, the regions corresponding to the skips are highlighted by graying. FIG. 11B is a graph that diagrammatically represents variations of the manifold pressure 1105 that might be seen during steady state operation of a four cylinder engine at a firing fraction of ⅓ at a given engine speed. FIG. 11C is a graph showing manifold pressure readings sampled at a rate of one sample per firing opportunity with the sample being taken late in the corresponding intake stroke. FIG. 11D is a graph diagrammatically representing the difference between the current manifold pressure reading and the manifold pressure reading for the previous induction opportunity (firing opportunity). FIG. 11D also illustrates a comparison of the difference to a fault threshold. FIG. 11E is a graph diagrammatically representing a fault signal that may be generated when an induction fault is detected. In each of the graphs, the X-axis is represented in firing opportunities. For a four cylinder, 4 stroke engine successive firing opportunity are separated by 180° of crankshaft rotation. In FIGS. 11B and 11C the manifold pressure is represented in the Y-axis. In FIG. 11A, the Y-axis represents the decision whether to skip or fire a particular firing opportunity. In FIG. 11D, the Y-axis represents the difference between the current sampled manifold pressure and the previous sampled manifold pressure. In FIG. 11E, the Y-axis represents the detection of an induction fault.

As can best be seen in FIG. 11B, once a particular intake event is completed (marked at points 1111), the intake manifold pressure begins to rise and continues to rise until the intake event associated with the next fired working cycle begins (marked as points 1113). Thus, when operating at the firing fraction of ⅓ which has a repeating pattern of Fire-Skip-Skip, the intake manifold pressure will rise during the two skipped intake events. When an induction event occurs, the manifold pressure drops noticeably until the induction is completed (points 1111) at which point the cycle repeats.

If the intake valve fails to deactivate when it was supposed to (thereby causing an induction event occurs when it was not supposed to), the manifold pressure during the corresponding expected skipped "intake" interval will be lower than expected because air is withdrawn from the manifold when it was not expected. The intake manifold pressure that might be seen after such an intake fault is diagrammatically represented by the dashed line in FIG. 11B marked 1120. As seen therein, the intake manifold pressure will often decrease when an intake valve fails to deactivate as intended—resulting in a noticeable decrease in the manifold pressure, relative to the expected pressure (which was expected to increase). The greatest difference between the measured manifold pressure and the expected manifold pressure is typically around the time that the intake valve for the associated cylinder is expected to close which is in the vicinity of the point marked as 1124.

In some embodiments, induction faults are identified by comparing a manifold pressure reading associated with an expected induction event with a manifold pressure reading associated with the previous induction opportunity. Preferably, the pressure readings are taken at substantially the same phases in their respective working cycles.

FIG. 11C diagrammatically illustrates intake manifold pressure samples 1130 that might be taken in an engine operating at a ⅓ firing fraction as illustrated in FIG. 11B. One sample is taken corresponding to each induction opportunity. The intake manifold pressure that might be seen after an induction fault (failure to deactivate) is represented by the dashed line marked 1130(a). It can be seen that significant differences can be seen between the sampled pressure and the expected pressure when an induction unexpectedly occurs.

FIG. 11D is a graph diagrammatically representing the difference 1135 between the current manifold pressure reading and the manifold pressure reading that was obtained for the immediately preceding induction opportunity. As will be described in more detail below with respect to FIG. 12, this difference is compared to a fault threshold 1137 and a fault signal 1138, shown in FIG. 11E, is generated thereby identifying a fault when the threshold is "exceeded" (past). It should be noted that when we are trying to identify a deactivation fault, in the illustrated context, the threshold is "exceeded" or "past" when the difference is less than, or more negative than, the threshold. Obviously the positive or negative direction of what constitutes "exceeding" the threshold will depend on whether the previous manifold pressure is subtracted from the current manifold pressure to determine the differential, or the current sample is subtracted from the previous sample.

Another point worth noting in FIG. 11D is that the pressure differential detected in association with a skipped induction opportunity tends to fluctuate based on whether the previous induction opportunity was a skip or a fire (induction event). In practice, with all other parameters being the same, a skipped induction event that follows a fire may be expected to have a bigger pressure differential than a skipped induction event that follows another skipped induction event. When there are a series of skipped induction events, the pressure differential will tend to decrease with each passing skipped induction event.

FIG. 11E illustrates a fault signal 1138 that may be generated when a fault is detected.

FIGS. 11F-11J are a series of graphs illustrating variations in manifold pressure that may occur during skip fire operation at a firing fraction of 4/5 and the generation of a fault signal based thereon. These graphs generally correspond to the graphs of FIGS. 11A-11E, except that they show similar events in the context of operating the engine at a firing fraction of 4/5.

FIG. 11G shows representative variations in the intake manifold pressure 1155 while operating at a firing fraction of 4/5. The effect of a failure to deactivate an intake valve in a working cycle that follows a single skip is illustrated by the dashed line marked 1170. As can be seen, the greatest differences between the measured manifold pressure and the expected manifold pressure are again around the times that the intake valves for the associated cylinders are expected to close—which is marked by point 1174. FIG. 11H shows representative pressure samples 1180 for each firing opportunity with dashed lines 1180(*a*) illustrating the results that might be seen in association with the deactivation failure illustrated in FIG. 11G. FIG. 11I shows the pressure differentials 1185 observed at each firing opportunity with the dashed line labeled 1185(*a*) illustrating differentials that might be observed in connection with the deactivation failure illustrated in FIG. 11G. FIG. 11J shows a detected deactivation fault 1188.

The type of fault described above with respect to FIGS. 11A-11J is a failure to deactivate an intake valve. That is, the valve opens when it was expected to remain closed. However, the same graphs can be used to illustrate the differences that might occur when a failure to activate (reactivate) an intake valve occurs. Such faults can occur on firing opportunities where a fire is intended. If the intent was to introduce an air charge into the corresponding working chamber at the points at which lines the dashed lines 1120 and 1170 separate from the corresponding solid lines, then the expected manifold pressure would follow the dashed line. Conversely, if a fault occurred at that point and the intake valve failed to open in the intended manner, the manifold pressure would follow the solid line. Thus, it should be apparent that the same approach can be used to identify failure to reactivate faults—although the appropriate firing opportunities and default threshold would be different.

FIGS. 11A-11J illustrate the pressure variations that would occur in the event that the deactivation of the intake valve completely fails (i.e., the valve fully opens when it was intended to be held closed). There can be other types of induction faults as well. For example, there may be timing fault errors in which a valve opens later or earlier than expected and/or valve lift errors in which the valve opens with a different valve lift than expected, etc. Each of these different types of faults will have an impact on the manifold pressure and it will often be possible to identify such faults—or at least the occurrence of a fault—using the same approach.

Figure 12:
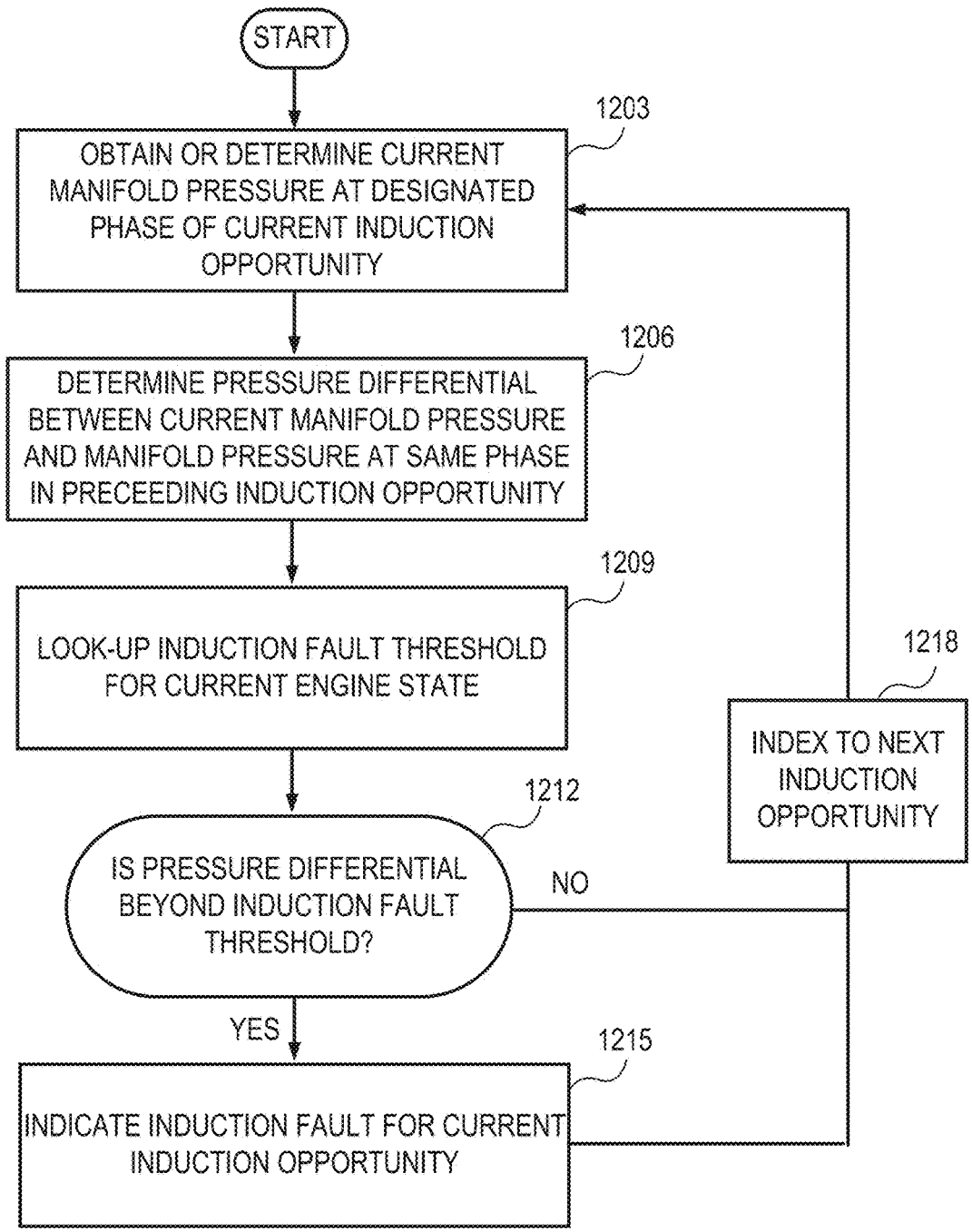
FIG. 12 is a flow chart illustrating a method of detecting induction faults in accordance with another embodiment.

Referring next to FIG. 12, a method of detecting induction faults in accordance with this embodiment will be described. The described process may be performed by software or firmware executed by an induction fault detection unit or other diagnostic unit. The induction fault detection unit may be part of a diagnostic module, the ECU or any other control module for the engine.

In the illustrated embodiment, the current manifold pressure is sampled at a designated phase of the current firing or induction opportunity as represented by block 1203. The specific timing at which the sample readings used in the induction fault analysis are made may vary widely based on a variety of factors including factors such as the timing of available manifold pressure samples, cam timing and/or valve lift, the number of operating cylinders, engine speed, etc. In a 4-stroke piston engine, the designated phase will typically be somewhere in the range of 120° to 180° past the top dead center that corresponds to the beginning of the intake stroke (as for example 150° past top dead center) as will be described in more detail below, although that is not a strict requirement.

The current manifold pressure is compared to the manifold pressure that was detected in the preceding induction opportunity as represented by block 1206 to determine the pressure differential. In parallel, the induction fault detection unit determines the induction fault threshold for current operating conditions as represented by block 1209. Typically this is accomplished using one or more look-up table(s) although in other embodiments, the appropriate fault thresholds may be identified using other suitable approaches including algorithmically, using other data structures, using fixed threshold values, etc.

One of the reasons that look-up tables work well is that the intake manifold dynamics, and therefore the appropriate pressure differential threshold for identifying induction faults, can vary significantly based on the engine's current operating conditions. There are a number of factors that influence intake manifold dynamics including the manifold's size and shape, atmospheric pressure, cam timing, recent induction history (e.g., skip/introduce in a skip fire controlled engine, or the charge level of recent air charges in multi-charge level engine operation), engine speed, variations in throttle position, the impact of turbo or super chargers in engines so equipped, etc. For example, with all other factors being the same, when the manifold pressure is higher, the pressure differential will be higher. When the engine speed is higher, the pressure differential will be lower since the cylinder has less time to draw air from the manifold when the valve is open. The number of skipped induction opportunities that immediately precede a particular induction opportunity will also affect dynamics because the amount of air introduced into the intake manifold during a skipped working cycle will typically drop after each skipped induction opportunity as the pressure differential across the throttle drops due to filing of the intake manifold.

When an induction opportunity is intended to be skipped, the measured manifold pressure should typically be higher than the pressure measured in the previous induction opportunity. In contrast, the measured manifold should typically be no higher (often significantly lower) than the previous measurement if the intake valve opened and an induction event occurred. However, since the throttle position, valve timing and/or other engine dynamics may be changing and the pressure samples may not be taken at the very end of an intake valve opening period, the pressure can foreseeable decrease some amount between sequential readings even when a skip occurs. In contrast, if the valve opened unexpectedly after a skip, the manifold pressure reading should have decreased noticeably. Due to the variations in manifold dynamics, it is often appropriate to utilize different induction fault thresholds for different operating conditions. To facilitate this, lookup tables may be used to select an appropriate pressure differential threshold for the current operating conditions, and different tables may be used based on whether the current induction opportunity is expected to intake air or skip induction. Generally different tables would be used to identify failure to deactivate inductions faults (failure to skip an induction event as intended) than are used to identify failure to activate induction faults (failure to induct air as intended during an induction opportunity).

The lookup tables used to identify the fault thresholds may be one-dimensional or multi-dimensional and a variety of different indices may be used for the lookup table. In some circumstances, multiple lookup tables may be used in conjunction with one another to determine the appropriate fault threshold. By way of example, in some embodiments, a first lookup index may be the intake manifold pressure ratio—which is the ratio of the intake manifold pressure to barometric pressure. A second index may be the number of skipped induction events that immediately preceded the current induction. In some embodiments, an additional or alternative index may be engine speed. In various other embodiments the indices to the look-up table may additionally or alternatively include one or more of: (i) a skip frequency indicative of a number of induction skips that are expected to occur in a designated period of time; (ii) the current intake manifold pressure; (iii) a firing fraction or effective firing fraction indicative of the fraction or effective fraction of the firing opportunities that are actually fired; (iv) throttle position; (v) the boost pressure (in boosted engines); (vi) cam phase; (vii) the intake valve lift profile; (viii) the skip/fire decision for the next firing opportunity; or (ix) other suitable parameters.

One specific approach to determining a failure to deactivate fault threshold will be illustrated with reference to FIGS. 13A and 13B. This approach utilizes two look-up table structures cooperatively to determine an appropriate fault threshold. The look-up table 1301 of FIG. 13A utilizes intake manifold pressure ratio and engine speed as its indices and each entry 1307 in the lookup table 1301 includes a base fault threshold value (indicator) 1309. The look-up table 1321 of FIG. 13B utilizes firing fraction and the number of immediately preceding skipped working cycles as its indices and each entry 1327 in the lookup table 1321 includes a fault threshold adjustment value (indicator) 1329. To determine the fault threshold for a particular induction opportunity, both the base fault threshold value 1309 and the fault threshold adjustment value 1329 are identified (looked up) based on the current engine operating conditions. The two values are then added together and their sum is used as the fault threshold (composite fault threshold). In these particular tables, the thresholds 1309 and 1329 are provided in kilopascals (kPa)—although it should be appreciated that the values may be provided in any appropriate units.

To illustrate the use of tables 1301 and 1321, consider an example in which the engine is operating at a firing fraction of ⅓, an engine speed of 2000 RPM, a manifold pressure ratio of 0.90 and the current firing opportunity is an intended skip (which corresponds to an intention to skip the current induction opportunity) that follows a fire. Using the table of FIG. 13A, in this example, the base fault threshold valve would be −0.8 kPa (based on the MAP pressure ratio of 0.90 and the engine speed of 2000 RPM) as represented by table entry 1313. Using the table of FIG. 13B, the fault threshold adjustment value would be −0.2 kPa (based on the firing fraction of ⅓ and the preceding skip count of 1) as represented by table entry 1323. The induction fault threshold would then be −1.0 kPa (−0.8+−0.2).

Although some particular lookup tables structures have been described, it should be appreciated that the specific structure(s) of the lookup table(s) (or other data structures) used to identify the appropriate induction fault threshold may vary widely in accordance with the preferences of any particular system. In some embodiments, altitude adjustments tables may be used to compensate for differences in barometric pressure. Altitude adjustment tables are particularly useful in implementations that don't utilize the MAP Pressure ratio, or otherwise account for variations in ambient barometric pressure.

Returning to FIG. 12, after both the pressure differential and the appropriate induction fault threshold have been obtained (1206, 1209), the pressure differential is compared to the induction fault threshold as represented by block 1212. If the pressure differential is beyond the threshold, a fault is identified for the current induction opportunity as represented by block 1215. Using the example from above, the pressure differential is the current pressure reading minus the pressure reading for the previous induction opportunity. If the current induction event was intended to be a skip and the pressure differential is a drop of more than 1.1 kPa, then it can be surmised that an induction event occurred when it was not intended, resulting in a failure to deactivate induction fault.

It should be appreciated that the positive or negative sense of the pressure differential will vary based on whether the current pressure reading is subtracted from the previous pressure reading or vice versa. Similarly, what direction constitutes "exceeding" a threshold to identify a fault will vary based on how the tables are set up. Thus it should be appreciated that in the context of this disclosure "exceeding" or "going beyond" a threshold can refer to a difference that is mathematically more than, or less than the threshold based upon how the tables are constructed and how the pressure differential between readings is determined.

The system may be configured to react to a detected induction fault in any way deemed appropriate by the controller designers. By way of example, in some embodiments, the fault is logged in a diagnostics induction fault log. If repeated faults are observed for a particular cylinder, a check engine light or similar warning can be activated to notify the driver to initiate maintenance. If repeated faults are associated with the same cylinder, that cylinder can be avoided until required maintenance is performed, etc. If the nature of the fault makes skip fire or other dynamic cylinder output level modulation operation of the engine untenable, such operating mode(s) can be temporarily disabled until the underlying problem that caused the fault(s) is resolved.

If no fault is detected in block 1212 or after the fault has been indicated in step 1215, the logic indexes to the next induction opportunity (block 1218) and the entire process is repeated for the next induction opportunity. This process may be repeated for each induction opportunity for as long as the fault monitoring remains active. In some embodiments, the system may be configured to only detect failures to deactivate an intake valve to thereby skip an induction event (deactivation failures) such that only failed skips are detected. In other embodiments, the system may be configured to detect only failures to activate an intake valve to thereby cause an induction event (reactivation failures). In other embodiments, both deactivation and reactivation failures may be detected. In still other embodiments, the described approach may be utilized to identify situations in which the valves were activated at the wrong level or at the wrong timing. This latter approach is particularly relevant during multi-charge level or multi-level skip fire operation of an engine where different valve actuation levels are expected. It is noted that when a "low" firing is expected in a stoichiometry based engine cycle, the cylinder is typically expected to induct a noticeably lower amount of air than when a "high" firing is expected. The lower air intake leads to a correspondingly higher manifold pressure and such differences can readily be detected using the described approach by using appropriate fault thresholds. In some embodiments, separate tables can be used to identify deactivation (or reactivation) failures and improper activation level failures to allow the nature of a detected failure to be more specifically determined.

As suggested above, when intake manifold pressure sampling is done, it is generally desirable to sample the manifold pressure at a point that is relatively late in the induction event. Therefore some care is preferably taken in choosing the timing of the sampling. Many engine controllers are configured to sample sensors at designated intervals that are based on crankshaft rotation. For example, some mid-level resolution controllers may be arranged to sample selected sensors (such as an intake manifold pressure sensor) every 30° of crankshaft revolution. Often one of the samples corresponds to the top dead center position of the piston as the intake stroke is about to begin. In such an embodiment, the sample that occurs at 150° into the working cycle works often works well for use in determining induction faults—although it should be appreciated that a wide variety of other sampling approaches can be used in other embodiments.

In some implementations it can be helpful to use the average of more than one sample in the determination of the "current" manifold pressure to be used by the induction fault detection algorithm. For example, the average or weighted average of 2 or 3 relevant samples may be used as the current manifold pressure reading. For example, in the context of the aforementioned mid-resolution sensor sampling approach, pressure samples may be available for time corresponding to 120°, 150°, and 180° of crankshaft rotation past top dead center. In various embodiments two or three of these samples could be averaged together to provide the current manifold pressure reading using either straight averaging or weighted averaging. For example, in a particular implementation two samples (e.g., 150° and 180°) could be averaged or a weighted average could be attained that applies a first (e.g. 70%) weighting to the first (e.g. 150°) sample and a second (e.g. 30%) weighting to the second (e.g. 180°) sample. In implementations where the manifold pressure samples are available at different rates—as for example at different crankshaft rotation locations or at time based periodic intervals that are independent of crankshaft rotation, the selection of the appropriate sample or samples to use as the measured manifold pressure can be selected appropriately.

In engines that utilize late intake valve closure (LIVC) to facilitate multi-level operation (such as Miller cycle operation), it may be desirable to utilize samples later in the working cycle (e.g. 180° or more after top dead center) to better account for the impacts of pushing air out of the cylinder during the first part of the "compression" stroke.

The graphs of FIGS. 11A-11J show applications of the invention in the context of a conventional 4-stroke engine having four cylinders. A characteristic of most 4 cylinder 4-stroke engines is that the intake stroke associated with the next firing opportunity typically will not have started when the intake manifold pressure sample is taken for any particular firing opportunity. This is because the intake strokes for sequential firing opportunities typically begin 180° apart and the intake stroke is 180° long. When the pressure sample for a particular firing opportunity is taken before the intake valve for the next firing opportunity is potentially opened, then the next firing decision does not interfere in any way with the pressure reading regardless of whether the subsequent firing decision is a skip or fire. In contrast, in engines having six, eight, or more cylinders, intake valve opening overlaps between sequentially fired cylinders are often expected. For example, in eight cylinder engines, sequential firing opportunities typically begin 90° apart. Therefore, in circumstances in which the "next" cylinder is intended to be fired and the pressure reading is made 150° into the intake stroke, it might be expected that the intake valve for the "next" cylinder will have opened before the intake manifold reading is made—which will affect the detected manifold pressure.

These effects can be accounted for in a variety of different ways including via selection of the appropriate fault threshold and/or selecting the timing/phase of the pressure readings (or the effective phase in circumstances in which the pressure reading averages or weighted averages more than one pressure sample). In some embodiments, the effects of the next firing decision might be integrated into a lookup table. For example, the next firing decision can be an additional index for the fault threshold lookup table such that the fault threshold varies based on whether the next firing opportunity is a skip or a fire. In engines with multiple firing levels the firing level may be used as an additional index. It is noted that this information is readily available to the diagnostics module because the next firing decision has to be made before the intake stroke for that cylinder begins so that the intake valve can be controlled appropriately.

In 6-cylinder engines, the overlap between potential valve openings tends to be less, so it is less of a problem, but the impacts of the overlap can be accounted for in the same ways.

It should be appreciated that there can also be valve opening overlap during operation of a four cylinder engine. For example, in many implementations, the intake valve for a particular working cycle may open near the end of the exhaust stroke in that cylinder's preceding working cycle. In another example, a valve may be operated using late intake valve closing (LIVC) control in some operational circumstances. The impacts of these types of overlaps can typically be accounted for by selecting the appropriate manifold pressure sampling timing and/or setting the fault threshold at a value that is unaffected by such types of overlapping. In other embodiments, the magnitude of the fault threshold can be based in part on the firing decisions for the next cylinder as discussed above.

Crankshaft Angular Acceleration Based Diagnostics

Figure 9:
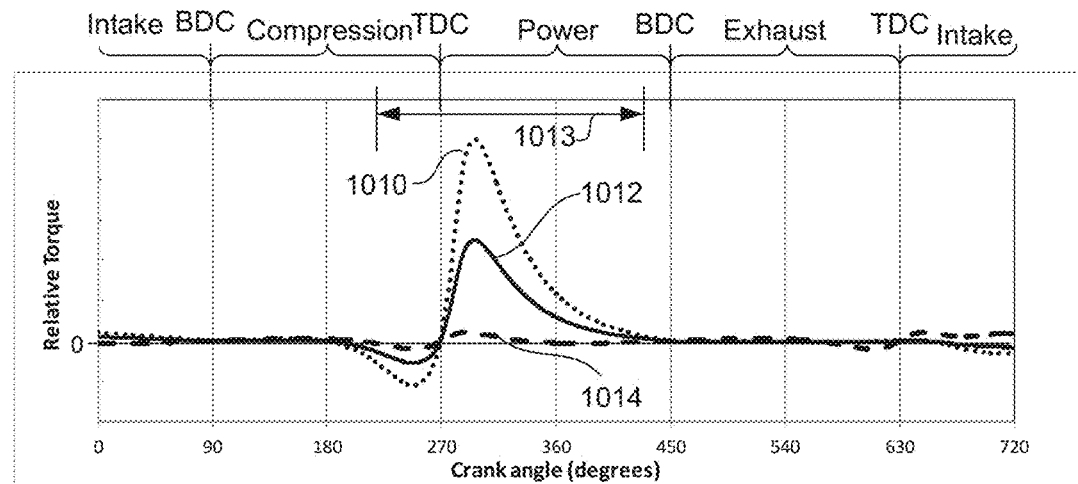
FIG. 9 is a representative plot of the torque absorbed and produced by a cylinder under test over an engine cycle for different types of induction events.

In some embodiments an algorithm using information on the crankshaft angular acceleration can be used to determine induction faults. FIG. 9 shows the torque profile of a cylinder over an engine cycle associated with different types of commanded intake valve action. A fire command with a high lift valve schedule generates a large torque pulse after top dead center (TDC), curve 1010. A fire command with a low lift valve schedule generates a smaller torque pulse after top dead center (TDC), curve 1012. Both curves 1010 and 1012 also show a negative torque pulse prior to TDC. In contrast a commanded skip, having no induction since the intake valve remains closed, results in little torque either generated or absorbed, curve 1014. These torque signature differences may be used to diagnose induction faults.

The torque signature of all engine cylinders and other engine loads can be estimated to determine a total net torque acting on the crankshaft. In skip fire operation the torque signature of each cylinder can vary on a cycle by cycle basis and this must be considered in the calculation of total net torque. Since the crank angular acceleration is proportional to torque, the net crankshaft angular acceleration can be calculated. The calculated angular acceleration may be defined as a reference angular acceleration. The reference angular acceleration represents the anticipated crank angular acceleration in the absence of any faults.

Actual crankshaft angular acceleration can be determined using input from a crank rotation sensor that measures the time period between passages of successive crank mounted indices past a fixed point. The measured crankshaft acceleration signal can be compared with the reference acceleration. If the measured acceleration signal deviates from the reference acceleration by more than a prescribed threshold a fault signal is generated.

It is advantageous to compare the measured and reference crank acceleration in a time window 1013 slightly before and somewhat after TDC between the compression and power stroke of the cylinder under test. As shown in FIG. 9 the difference in torque between the different induction states (high lift, low lift, no lift) is greatest in this area, so detecting the differences is easiest during this time window. The comparison may be made over the entire time window 1013 or any portion or multiple portions thereof.

In determining the reference acceleration it is essential to consider operation of other engine cylinders in addition to the cylinder under test. Generally the engine cylinders adjacent to the cylinder under test in the engine firing order have the most influence on the torque during the induction fault test window 1013 and are most important to consider when determining the reference acceleration. Of particular importance is whether these cylinders were skips or fires because, as shown in FIG. 9, the largest torques are generated during the compression and power stroke and these strokes of the adjacent cylinders can partially overlap with the fault detection window of the cylinder under test. The adjacent cylinder firing pattern can take four possible forms, i.e. skip-skip, skip-fire, fire-skip, fire-fire. Depending on the adjacent cylinder pattern the reference threshold may vary. The influence of adjacent cylinders on the expected torque from a cylinder under test is described in U.S. patent application Ser. Nos. 14/207,109 and 14/880,652, which are incorporated herein by reference. In other embodiments, more complex cylinder pressure models that consider the effects of still other (e.g. non-adjacent) cylinders may be used to determine the reference crank acceleration. This may be a model that considers the impact of all of the cylinders or a larger subset of the cylinders beyond simply the adjacent cylinders in the firing order. Some such models are described in the incorporated '652 application.

Figure 10:
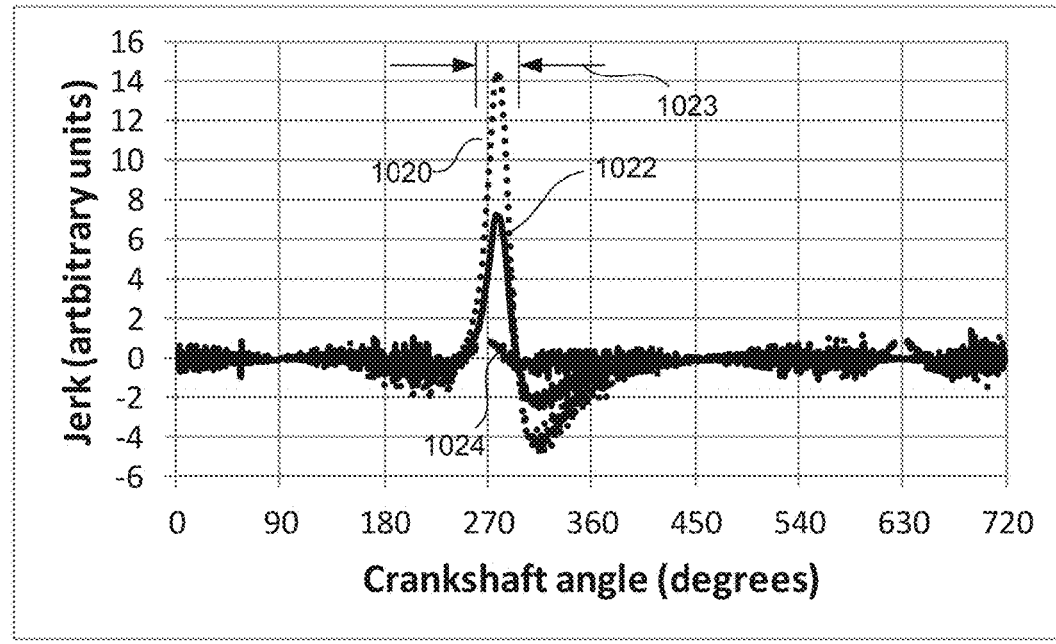
FIG. 10 is a representative plot of the calculated crankshaft jerk induced by a cylinder under test over an engine cycle for different types of induction events.

Aside from and/or in addition to crankshaft angular acceleration, the time derivative of the angular acceleration, jerk, may be used to detect induction faults. FIG. 10 shows the jerk as a function of crankshaft angle. Curves 1020, 1022, and 1024 show the jerk associated with the high lift, low lift, and no lift induction states, respectively. These three jerk curves are effectively the slope of the angular acceleration curves 1010, 1012, and 1014 shown in FIG. 9. The time window for induction fault detection 1023 using crank jerk may be smaller than the detection window using crank acceleration 1013, since the jerk peaks are narrower in time than those associated with the angular acceleration.

In should be appreciated that while the methods described here compare a reference angular acceleration or jerk with the corresponding measured values, substantially equivalent comparison may be made using other parameters. For example, instead of determining a reference angular acceleration a reference torque may be determined. A comparison may then be made whether the measured torque (based on the crankshaft angular acceleration) is consistent with the reference value.

Additionally, in some skip fire control schemes when a cylinder under test is scheduled to be a skip, but the intake valve fails to deactivate, air is inducted into the cylinder during the intake stroke and compressed; however, it is not fired during the combustion stroke. In such operation the cylinder is operating as an air spring. This operational mode produces a distinctive torque and jerk signature like those shown in FIGS. 9 and 10 for other operational modes. An induction fault in this operational mode may be detected using the same techniques as described above.

Other Features

While detection of an induction fault has been described by measuring the MAP and crankshaft accelerations it should be appreciated that the approaches may be combined with each other. That is both a MAP based fault signal and crank acceleration based fault signal could be input into an AND gate. A fault would only be registered if both inputs indicated the presence of a fault. In an alternative architecture the MAP and crankshaft based diagnostics could produce a three state (yes, no, and maybe) or continuous output. These outputs could be combined in various ways to generate the fault signal. For example, one system producing a "maybe" and the other producing a "yes" may be interpreted as a fault. Alternatively, both systems may generate a continuous value between 0 and 1, where 0 represents definitely no fault and 1 represents definitely a fault. Intermediate values can be combined in various ways to determine whether a fault is present For example if the MAP based system gave a reading of 0.8 and the crank based system gave a reading of 0.6 these readings could be summed to give a value of 1.4, which might be above a detection threshold indicating a fault. These types of architecture combining multiple inputs may result in fewer false positive fault detections than a system based on a single measured parameter. It is also possible to combine the MAP and/or crank fault signal with other diagnostic signals; for example, an intake valve proximity sensor, an in-cylinder pressure sensor, an exhaust pressure sensor and/or oxygen sensor, to provide for a further reduced error level.

The generated fault signals may be inputted into an OBD system. The OBD system may perform statistical analysis on the fault signals to determine whether any corrective action is required. For example, reoccurring faults on a particular cylinder may indicate a failure in some aspect of that cylinder's induction system requiring corrective action. An indicator may alert a vehicle driver that such action is required.

The figures refer to subcomponents and functional blocks that perform various functions. It should be appreciated that some of these subcomponents may be combined into a larger single component, or that a feature of one subcomponent may be transferred to another subcomponent. The present invention contemplates a wide variety of control methods and mechanisms for performing the operations described herein, and is not limited to what is expressly shown in the figures. For example, in the various illustrated embodiments, the firing information provided to the induction failure detection unit 102 is typically described as coming from the firing fraction calculator 112 and/or the firing timing determination module 120. Although this architecture works well, it should be appreciated that such information can come from any suitable source. For example, in many implementations, the functionality of the firing fraction calculator and firing timing determination module will be accomplished by an engine control unit (ECU) or a power train controller that may not incorporate readily identifiable modules that perform the corresponding functions.

The invention has been described primarily in the context of controlling the firing of 4-stroke piston engines suitable for use in motor vehicles. However, it should be appreciated that the described skip fire approaches are very well suited for use in a wide variety of internal combustion engines. These include engines for virtually any type of vehicle—including cars, trucks, boats, construction equipment, aircraft, motorcycles, scooters, etc.; and virtually any other application that involves the firing of working chambers and utilizes an internal combustion engine. The various described approaches work with engines that operate under a wide variety of different thermodynamic cycles—including virtually any type of two stroke piston engines, diesel engines, Otto cycle engines, Dual cycle engines, Miller cycle engines, Atkinson cycle engines, Wankel engines, axial engines and other types of rotary engines, mixed cycle engines (such as dual Otto and diesel engines), radial engines, etc. It is also believed that the described approaches will work well with newly developed internal combustion engines regardless of whether they operate utilizing currently known, or later developed thermodynamic cycles. The described embodiments can be adjusted to work with engines having equally or unequally sized working chambers.

While the described embodiments work well with dynamic skip fire engine operation, it should be appreciated that it may be applied to other types of engine control which may be concerned about the possibility of induction faults. This includes virtually any skip fire application (operational modes in which individual cylinders are sometimes fired and sometime skipped during operation in a particular operational mode) including skip fire operation using fixed firing patterns or firing sequences as may occur when using rolling cylinder deactivation and/or various other skip fire techniques. Similar techniques may also be used in various skip fire like techniques such as multi-charge level engine operation or other cylinder output level modulation techniques. Similar techniques may also be used in connection with variable stroke control engine operation. In variable stroke engine control, the number of strokes in each working cycle are altered to effectively vary the displacement of an engine. In multi-charge level engine operation, the output of fired cylinders are varied dynamically in a skip/fire type pattern. For example, a particular cylinder may sometimes be fired at a "high" or "higher" torque output level and may sometimes be fired at a "low" or "lower" torque output level, with the "low" output levels corresponding to the "skips" and the "high" output levels corresponding to the fires in a skip fire pattern. In another example, a multi-level skip fire pattern may include some "skips", some "low" firings and some "high" firings. A variety of multi-charge level modulation and multi-level skip fire techniques are described in Applicant's U.S. patent application Ser. No. 14/919,018, which is incorporated herein by reference. One way to differentiate between "high" and "low" firings is to modulate the valve lift which can lead to valve lift fault based induction faults which can be detected using the described techniques.

The invention has generally been described in terms of a skip fire control system that fires a fuel/air charge during the same cycle as the induction event that filled the cylinder with the charge. Also, the invention has generally been described in terms of a skip fire control system that vents the combustion gases from a cylinder firing during an exhaust stroke immediately following the power stroke where the fuel/air charge was firing. Neither of these valve control schemes is a requirement. A cylinder may induct an air charge and wait one or more cycles before firing the charge. Similarly, a cylinder may hold combustion gases within the cylinder for one or more engine cycles after a combustion event. Engines operating in this manner will have different MAP and crankshaft variation signatures, but the methods described here can be readily adapted to accommodate these different valve control schemes.

Although only a few embodiments of the invention have been described in detail, it should be appreciated that the invention may be implemented in many other forms without departing from the spirit or scope of the invention. Therefore, the present embodiments should be considered illustrative and not restrictive and the invention is not to be limited to the details given herein.

What is claimed is:

1. A method of detecting an induction fault in an internal combustion engine having an intake manifold that supplies air to at least one working chamber of the internal combustion engine, and an intake manifold pressure sensor configured to sense an air pressure within the intake manifold, the method comprising:
  obtaining a first pressure reading indicative of the intake manifold pressure at a time associated with a first working chamber air induction opportunity;
  obtaining a second pressure reading indicative of the intake manifold pressure at a time associated with a second working chamber air induction opportunity that follows the first working chamber induction opportunity, the second air induction opportunity being the next air induction opportunity following the first air induction opportunity; and
  determining whether an induction fault has occurred in association with the second air induction opportunity based at least in part on the first and second pressure readings.

2. A method as recited in claim 1 further comprising:
  determining a difference between the first and second pressure readings;
  comparing the difference to a threshold; and
  identifying an induction fault for the second air induction opportunity when the difference is beyond the threshold.

3. A method as recited in claim 1 wherein each pressure reading is based on a plurality of pressure measurement samples.

4. A method as recited in claim 1 wherein each pressure reading is made at substantially the same phase in a working cycle associated with its associated induction opportunity.

5. A method as recited in claim 4 wherein each pressure reading is made:
  during an associated intake stroke of a piston in an associated working chamber in which the associated working cycle occurs; and
  within a range of 150 degrees±30 degrees of crankshaft rotation after top dead center of the piston in the associated intake stroke.

6. A method as recited in claim 1 wherein the threshold is based at least in part on how many air induction opportunities were skipped immediately before the second air induction opportunity.

7. A method as recited in claim 1 wherein the threshold is based at least in part on an intake manifold pressure ratio, wherein the intake manifold pressure ratio is a ratio of intake manifold pressure to barometric pressure.

8. A method as recited in claim 1 wherein the threshold is based at least in part on a current operational firing fraction of the engine.

9. A method as recited in claim 1 wherein the threshold is based at least in part on a current engine speed.

10. A method as recited in claim 1 performed while the engine is operating in a multi-charge level operational mode.

11. A method as recited in claim 1 performed while the engine is operating in a skip fire operational mode.

12. An induction fault lookup table embodied in a non-transitory computer readable medium associated with an engine controller for use in identifying air induction faults, the induction fault lookup table comprising:
a multiplicity of entries that identify induction fault thresholds, and
wherein the induction fault lookup table includes at least one index selected from the group consisting of (i) a number of skipped induction opportunities that immediately preceded a current induction opportunity, (ii) an intake manifold pressure ratio, (iii) an operational firing fraction, and (iv) an engine speed.

13. An induction fault lookup table as recited in claim 12 wherein the induction fault lookup table includes at least two indices selected from the group consisting of (i) the number of skipped induction opportunities that immediately preceded a current induction opportunity, (ii) the intake manifold pressure ratio, (iii) the operational firing fraction, and (iv) the engine speed.

14. An induction fault lookup table as recited in claim 12 wherein the induction fault lookup table is a multi-dimensional lookup table having both (i) the number of skipped induction opportunities that immediately preceded a current induction opportunity, and (ii) the intake manifold pressure ratio as indices.

15. An induction fault lookup table as recited in claim 12 wherein an additional index for the lookup table is selected from the group consisting of:
a skip frequency indicative of a number of induction skips that are expected to occur in a designated period of time;
a throttle position;
intake manifold pressure;
cam phase;
boost pressure;
intake valve lift profile; and
skip/induct decision for a next firing opportunity.

16. An induction fault lookup table as recited in claim 12 composed of first and second lookup table segments, wherein:
a first index for the first lookup table segment is intake manifold pressure ratio;
a second index for the first lookup table segment is engine speed;
a first index for the second lookup table segment is firing fraction; and
a second index for the second lookup table segment is the number of skipped induction opportunities that immediately precede the current induction opportunity; and
wherein values retrieved from the first and second lookup tables segments are summed to determine to provide a composite induction fault threshold.

17. A diagnostics module configured to detect induction faults that occur during operation of an internal combustion engine that includes an intake manifold that supplies air to at least one working chamber of the internal combustion engine, and an intake manifold pressure sensor configured to sense an air pressure within the intake manifold, the diagnostic module comprising a controller configured to:
obtain a first pressure reading indicative of the intake manifold pressure at a time associated with a first working chamber induction opportunity that has the potential to draw air from the intake manifold;
obtain a second pressure reading indicative of the intake manifold pressure at a time associated with a second working chamber induction opportunity that has the potential to draw air from the intake manifold, the second working chamber induction opportunity being the next working chamber induction opportunity following the first working chamber induction opportunity; and
determine whether an induction fault has occurred in association with the second working chamber induction opportunity based at least in part on the first and second pressure readings.

18. A diagnostics module as recited in claim 17 further comprising an induction fault lookup table embodied in a computer readable medium associated with the controller for use in identifying induction faults, the induction fault lookup table comprising a multiplicity of entries that identify induction fault thresholds used in the determination of whether an induction fault has occurred, wherein different entries in the induction fault lookup table correspond to thresholds suitable for use under different operating conditions.

19. A diagnostics module as recited in claim 18 wherein the induction fault lookup table includes at least one index selected from the group consisting of (i) a number of skipped induction opportunities that immediately preceded the second working chamber induction opportunity, (ii) an intake manifold pressure ratio, or (iii) an operational firing fraction.

20. A diagnostics module as recited in claim 18 wherein the controller is further configured to:
determine a difference between the first and second pressure readings;
compare the difference to a threshold; and
identifying an induction fault for the second induction opportunity when the difference exceeds the threshold.

21. A diagnostics module as recited in claim 18 wherein the controller is further configured to make a pressure reading at substantially the same phase in each working cycle.

22. An engine controller comprising the diagnostics module as recited in claim 17 and a skip fire controller configured to direct operation of an engine in a skip fire operational mode and wherein:
the diagnostic module is configured to detect induction faults during skip fire operation of the engine.

23. An engine controller comprising the diagnostics module as recited in claim 17 and a cylinder output level modulation controller configured to direct operation of an engine in a cylinder output level modulation operational mode and wherein:
the diagnostic module is configured to detect induction faults during cylinder output level modulation operation of the engine.

* * * * *